United States Patent [19]
Leavitt et al.

[11] Patent Number: 5,974,473
[45] Date of Patent: Oct. 26, 1999

[54] SYSTEM FOR CONTROLLING INSERTION, LOCKING, AND REMOVAL OF MODULES BY REMOVING PLURALITY OF DEVICE DRIVERS FOR MODULE TO BE REMOVED FROM BIOS AND INFORMING BIOS OF MODULE REMOVAL

[75] Inventors: Thomas Leavitt; David L. Harvey, both of Temple, Tex.; Seong Shin, St. Cupertino, Calif.

[73] Assignee: Texas Instruments Incorporated, Dallas, Tex.

[21] Appl. No.: 08/663,499

[22] Filed: Jun. 14, 1996

[51] Int. Cl.⁶ .................................. G06F 9/40; G06F 1/32
[52] U.S. Cl. .................................. 710/8; 710/15; 710/108; 709/301; 713/2; 713/330
[58] Field of Search ...................................... 395/652, 681, 395/828, 651, 835, 653, 183.1, 750.01, 750.08, 750.06, 288; 710/8, 15, 108; 713/2, 1, 330

[56] References Cited

U.S. PATENT DOCUMENTS

| | | | |
|---|---|---|---|
| 5,182,809 | 1/1993 | Begun et al. | 395/725 |
| 5,202,990 | 4/1993 | Saikawa | 395/650 |
| 5,386,567 | 1/1995 | Lien et al. | 395/700 |
| 5,546,098 | 8/1996 | Moriconi | 345/3 |
| 5,557,739 | 9/1996 | Gupta et al. | 395/183.1 |
| 5,594,907 | 1/1997 | Tanaka | 395/750 |
| 5,659,680 | 8/1997 | Cunningham et al. | 395/183.01 |
| 5,694,600 | 12/1997 | Khenson et al. | 395/652 |
| 5,784,615 | 7/1998 | Lipe et al. | 395/681 |

OTHER PUBLICATIONS

IBM TDB, "DOS Dynamic Device Driver", IBM Corporation, pp. 1–2, May 1986.
IBM TDB, "Support of a Dynamically Managed Device Switch Table on a UNIX Operating System", IBM Corporation, pp. 1–3, Mar. 1992.
IBM TDB, "Device Initialization", Hewlett–Packard, pp. 1–4, Aug. 1992.

*Primary Examiner*—Thomas C. Lee
*Assistant Examiner*—Rehana Perveen
*Attorney, Agent, or Firm*—Ronald O. Neerings; Richard L. Donaldson

[57] ABSTRACT

This is a method and system to lock and release modules on computing devices. The system may include: An automatic lock system for modules on a computing device, the system comprising: a processor connected to a system bus; an input means connected to the processor by the system bus; an output means connected to the processor by the system bus; and a module that inserts into the computing device and is connected to the system bus; a module controller that controls the module and is connected to the system bus; a latch that locks and releases the module to and from the computing device; and a subsystem that controls the latch. The system may also include a basic input/output system (BIOS). The subsystem may include: a means to determine whether the module is being accessed by the processor; a means to communicate to the module controller to terminate input/output activity; a means to remove a plurality of device drivers for the module from the BIOS; and a means to inform an operating system that the module is removed. The module may include: a battery system, a media bay module, a CD-ROM, a hard disk drive, a floppy disk drive, and a magneto-optical drive. Other devices, systems and methods are also disclosed.

15 Claims, 10 Drawing Sheets

SYSTEM FOR CONTROLLING INSERTION, LOCKING, AND REMOVAL OF MODULES BY REMOVING PLURALITY OF DEVICE DRIVERS FOR MODULE TO BE REMOVED FROM BIOS AND INFORMING BIOS OF MODULE REMOVAL

CROSS-REFERENCE TO RELATED APPLICATIONS

The following coassigned patent application is hereby incorporated herein by reference:

| Serial No. | Filing Date | TI Case No. |
|---|---|---|
| 08/663,502 | 06/14/96 | TI-22746 (now pending allowance) |

FIELD OF THE INVENTION

This invention generally relates to devices with a module locking system controlled by computer software.

BACKGROUND OF THE INVENTION

Although this invention is described in relation to a computer, and specifically a notebook computer, it may be implemented into any device that has locking system controlled by a computer software program.

Today, computer computers may include anything the user may dream of from CD-ROM players to 2 gigabyte hard disk drives, to fully accessoried docking stations. However, in order to reduce the size and weight of the computer, the computer manufacturer must be choose what items the user must have and what items the user can do without in a computer that the size and weight that the user wants.

A method to provide the user the most flexibility and lightest and smallest computer, is to provide a media bay with swapable options. A computer may include a Media Bay that allows the user to customize the computer for different applications or environments. A customizable Media Bay could include options for a number of peripherals. For example, the media bay could include: a CD-ROM drive, a secondary hard disk, a floppy diskette drive, a magneto optical (MO) drive, or an additional battery. With these type of options, the user could dynamically change the computer to accommodate multimedia applications, more storage, lighter weight, removable mass storage, or longer battery life.

When used with a Plug and Play (PnP) operating system, a computer will provide the user with seamless insertion and removal of the media bay options; peripherals can be "hot plugged" into the media bay while the computer is running. However, while this hot plugged feature is advantageous, it is also very dangerous. Even though the computer may allow the user to remove or insert the media bay module at anytime, it may not be wise to do so. Users may damage the hardware or lose data if the swap is not handled carefully.

SUMMARY OF THE INVENTION

This invention provides a system for the user to change the media bay module when the computer is turned on and not damage the media. In addition, this method will operate with the Plug and Play (PnP) options of the Microsoft™ Windows 95™ operating system. The present invention is implemented with a computer software program that locks and releases the media bay module. However, the present invention can also include a manual lever that can eject the media bay module whenever the computer is turned off.

Once a media bay module is inserted into the computer, a locking mechanism insures that the device is secure inside the bay. Optionally a password can be used to prevent the device from being removed. When the user wants to remove a device from the bay, the present invention is invoked and commanded to release the module. However, the present invention will first query the operating system to find out if it is safe to unlock the device; thus, the system protects against data loss or device damage resulting from accidental removal of a device in use.

This is a method and system to lock and release modules on computing devices. The system may include: An automatic lock system for modules on a computing device, the system comprising: a processor connected to a system bus; an input means connected to the processor by the system bus; an output means connected to the processor by the system bus; and a module that inserts into the computing device and is connected to the system bus; a module controller that controls the module and is connected to the system bus; a latch that locks and releases the module to and from the computing device; and a subsystem that controls the latch. The system may also include a basic input/output system (BIOS). The subsystem may include: a means to determine whether the module is being accessed by the processor; a means to communicate to the module controller to terminate input/output activity; a means to remove a plurality of device drivers for the module from the BIOS; and a means to inform an operating system that the module is removed. The module may include: a battery system, a media bay module, a CD-ROM, a hard disk drive, a floppy disk drive, and a magneto-optical drive.

The method of locking and releasing a module in a computing device may include: requesting device removal from a basic input/output system (BIOS); determining whether application programs have any files open on module; removing a plurality of device drivers for the module; and informing the BIOS to remove the module. Other devices, systems and methods are also disclosed.

DETAILED DESCRIPTION OF PREFERRED EMBODIMENTS

FIGS. 1–4 illustrate a portable personnel computer which the present invention could be implemented on. FIGS. 5–16 illustrate details of the present invention.

Figure 1:
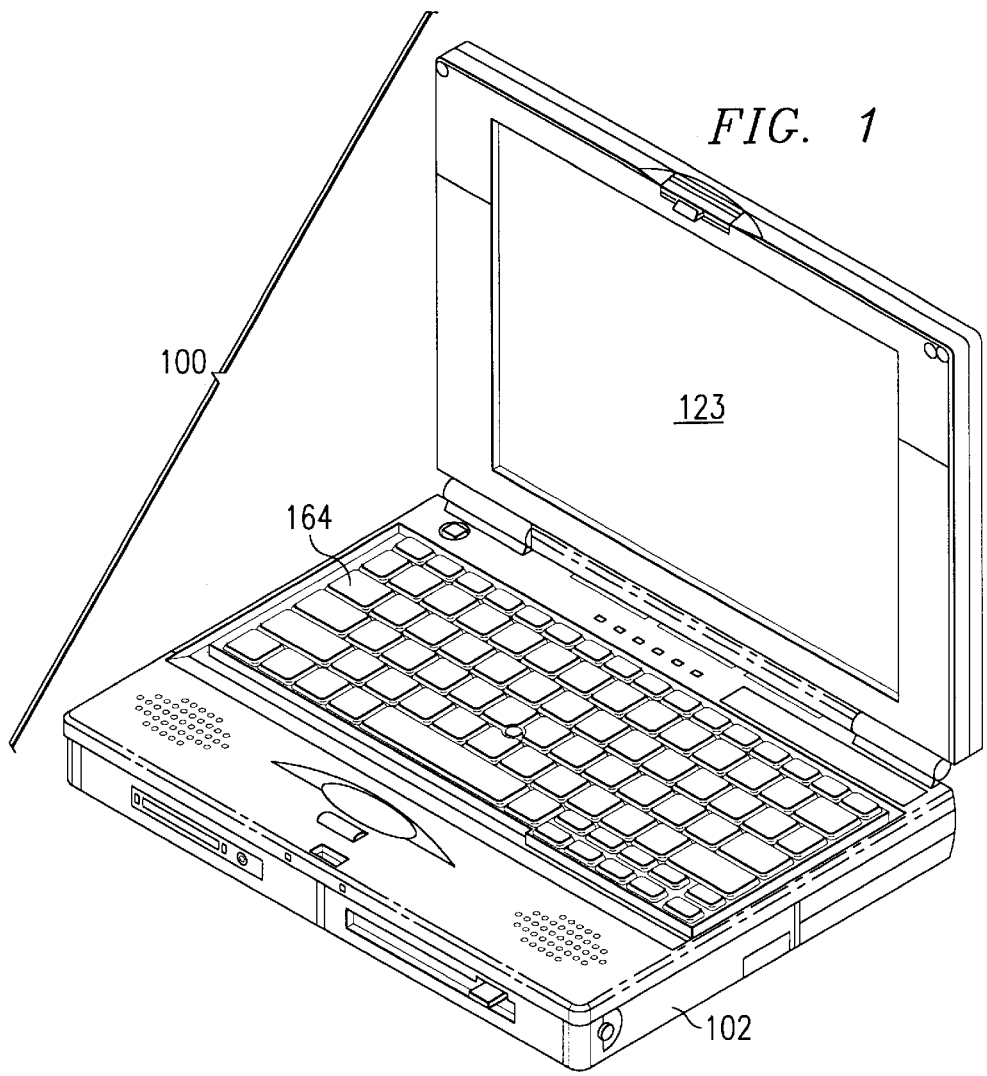
FIG. 1 is an isometric view of a portable computer.

FIG. 1 illustrates a portable personal computer 100 having a primary display 123, a base unit 102 and a keyboard 164. The present invention is ideally suited for the portable computer 100. The alternate display could include a clear window made of plastic or glass directly above the PCMCIA cards. In addition, the display could include a sliding privacy window, to close the clear window for privacy purposes. However, the alternate display could include an opaque window that slides back to leave an opening to see the PCMCIA card display. Moreover, one possible configuration for the alternate display would display messages in one or two lines, and scroll as needed. However, although FIG. 1 illustrates one embodiment, other embodiments will be discussed later.

Figure 2:
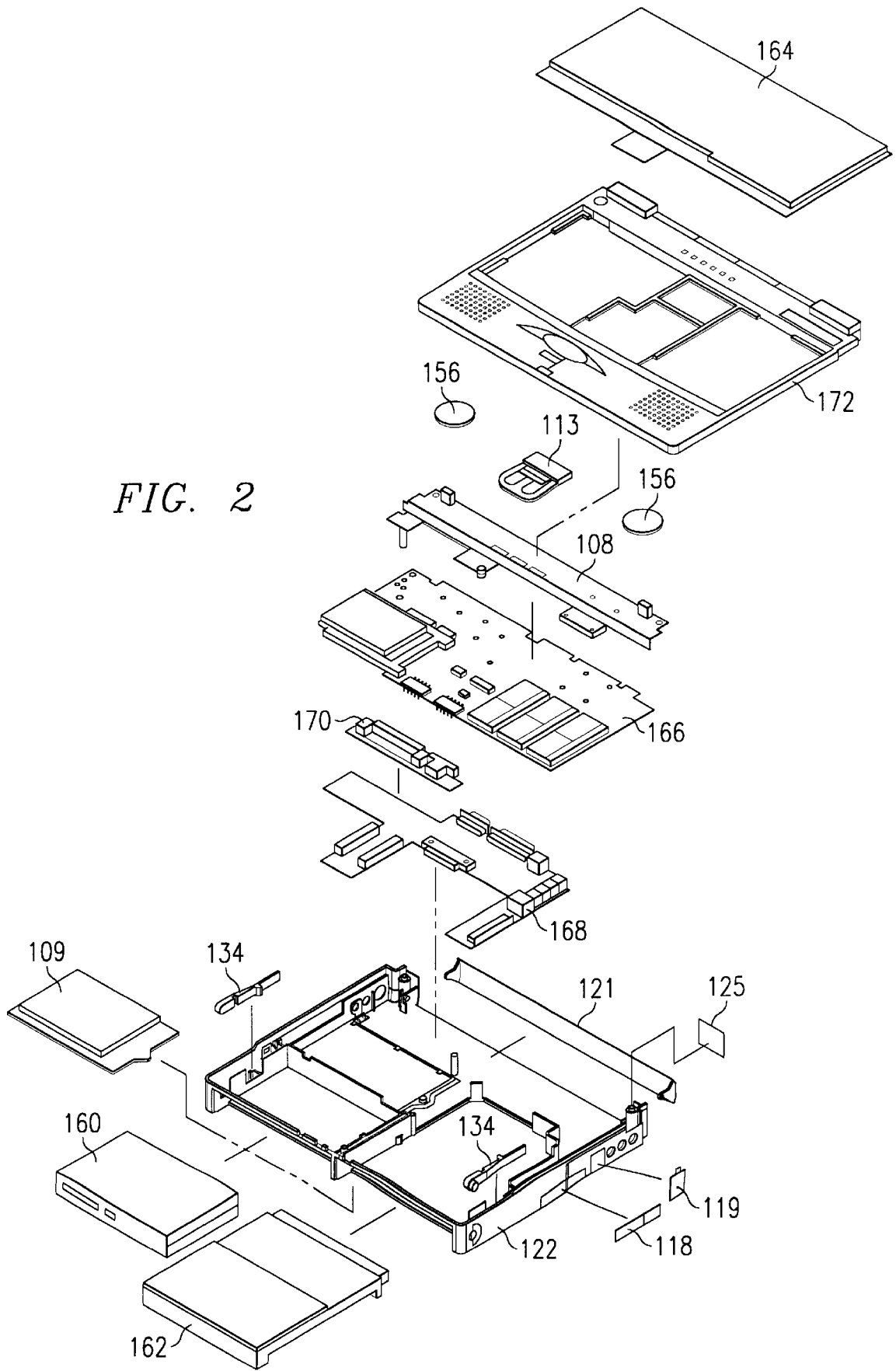
FIG. 2 is an exploded view of the base of the portable computer of FIG. 1.

FIG. 2 illustrates an exploded view of the base unit 102 of FIG. 1. Keyboard 164 is attached to top cover 172. The speaker assemblies 156 and the pick button assembly 113 both attach to the top cover 172. Moreover, the top printed wiring board 166 and the bottom printed wiring board 168 are attached to the heatplate and printed wiring board assembly 108. The bus/VGA printed wiring board 170 also attaches to the bottom printed wiring board 168. The assembly 108 and printed wiring boards 168, 170 and 166 fit into the base assembly 122.

The base assembly 122 has a connector door 121 that exposes the connectors for the user's access. The connector door 121 is operated by the door release button 125. The base assembly 122 also has a modem door 118, hard drive assembly 109 and media release latches 134. The media release latches 134 release and secure the battery pack 160 and media bay 162.

Figure 3:
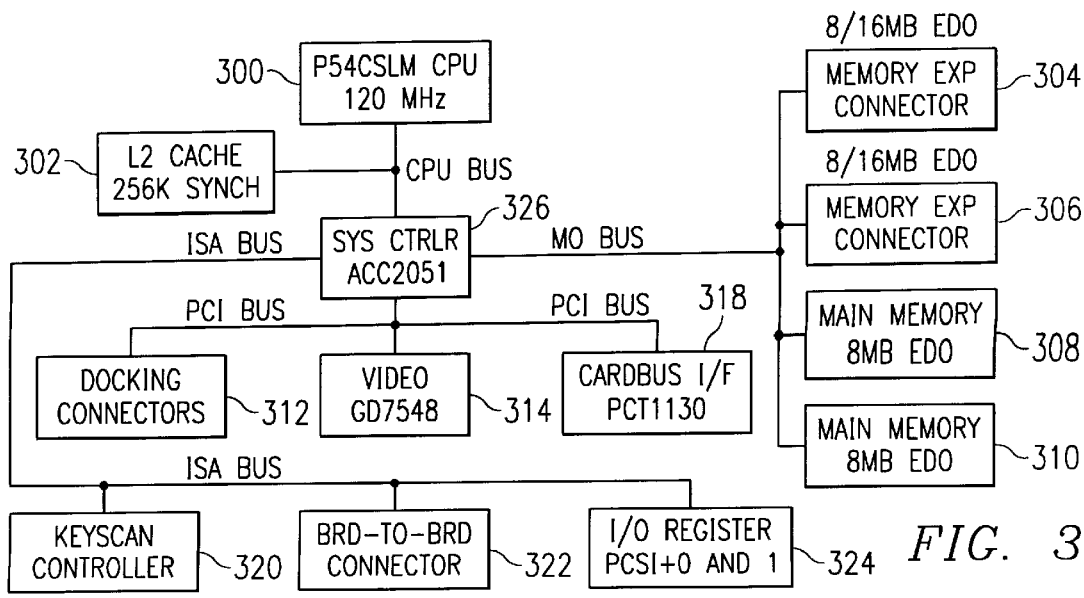
FIG. 3 is a block diagram of the electronic architecture of the portable computer of FIG. 1.

FIG. 3 is a block diagram of the top printed wiring board 166 of portable computer 100 (shown in FIG. 2). Portable computer 100 is a color portable computer based upon the Intel™ Pentium™ microprocessor 300. Operating speed of the Pentium™ is 120 Mhz internal to the processor, but with a 60 Mhz external bus speed. A 60 Mhz oscillator is supplied to the ACC Microelectronics 2056 core logic chip which in turn uses this to supply the microprocessor. This 60 Mhz CPU clock is multiplied by a phase locked loop internal to the processor to achieve the 120 Mhz CPU speed. The processor 300 contains 16 KB of internal cache and 256 KB of external cache 302 on the logic board.

The 60 Mhz bus of the CPU is connected to a VL to PCI bridge chip 326 from ACC microelectronics to generate the PCI bus, the ISA bus and the MD bus. The bridge chip takes a 33.333 Mhz oscillator to make the PCI bus clock. The primary video controller 314 and alternate video controller 316 are driven from the PCI bus. In addition, both, a docking options connector 312 and a cardbus I/F 318 are connected to the PCI bus. The cardbus I/F 318 connects a PCMCIA card system which allows two PCMCIA cards to be connected to the PCI bus. These slots may be used with third party boards to provide various expansion options.

The primary video controller 314 has a 14.318 Mhz oscillator input which it uses internally to synthesize the higher video frequencies necessary to drive an internal 10.4" TFT panel or external CRT monitors. When running in VGA or Super VGA resolution modes, the TFT panel may be operated at the same time as the external analog monitor. For XVGA resolutions only the external CRT may be used. In addition, the PCMCIA card system has a zoom video connection to the primary video controller.

Portable computer 100 contains 16 Megabytes of standard memory 308, 310 which may be increased by the user up to 48 Megabytes by installing optional expansion memory boards 304, 306. The first memory expansion board can be obtained with either 8 or 16 Megabytes of memory. With the first expansion board installed, another 8 or 16 Megabytes of memory may be attached to make the maximum amount.

Operation input to portable computer 100 is made through the keyboard and an internal pointing device imbedded in the keyboard. Both types of input feed into the keyscan controller 320 which is connected by the ISA bus. In addition, I/O register 324 is connected through the ISA bus. Moreover, a board-to-board connector 322 connects the top printed wiring board to the bottom printed wiring board.

Figure 4:
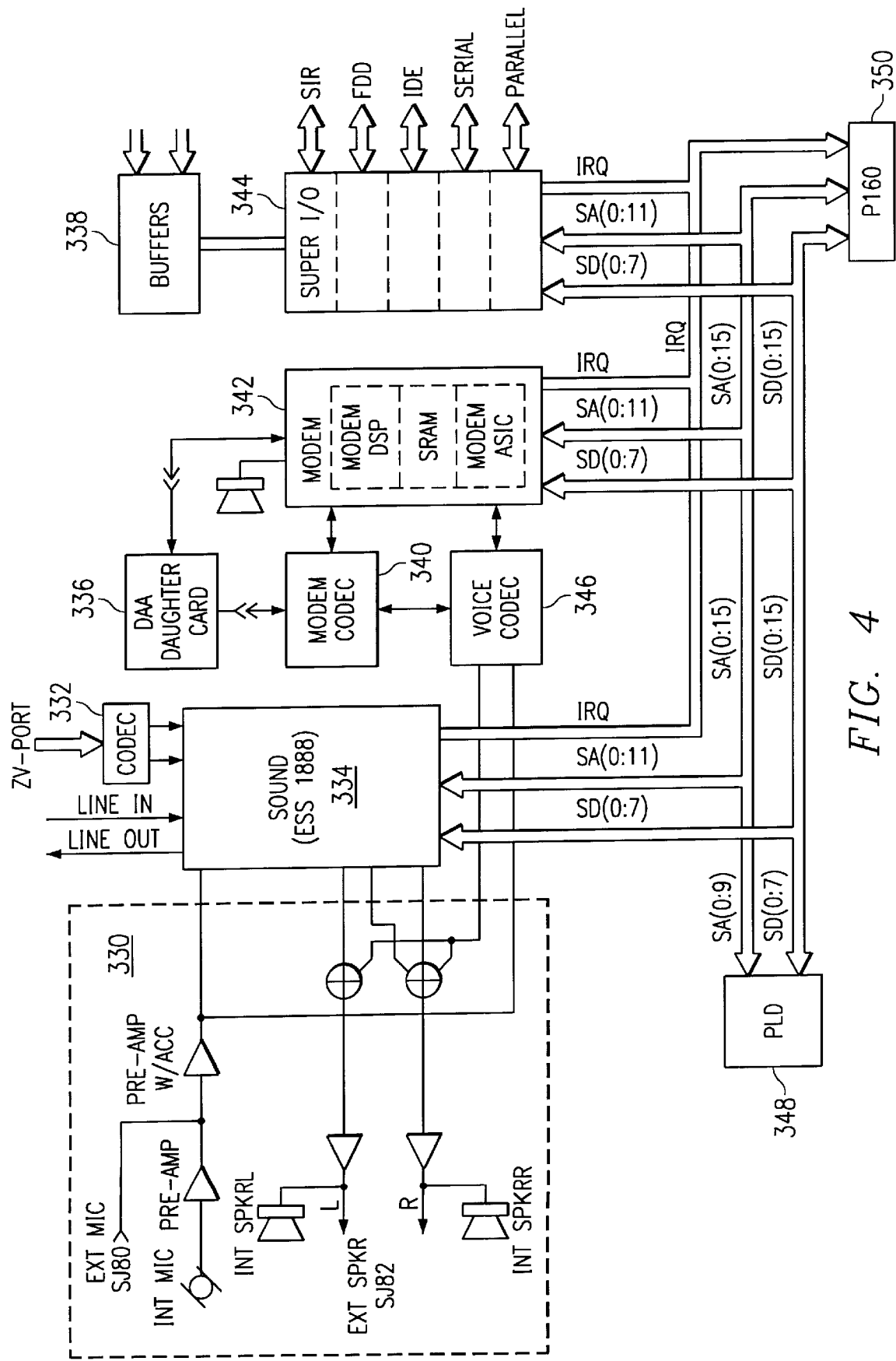
FIG. 4 is another block diagram of the electronic architecture of the portable computer of FIG. 1.

FIG. 4 is a block diagram of the bottom printed wiring board 168 of the portable computer 100 (shown in FIG. 2). The battery system (not shown) of portable computer 100 is Lithium Ion and has internal controllers which monitor the capacity of the battery. These controllers use a 4.19 Mhz crystal internal to the battery.

Portable computer 100 also has an internal sound chip 334 which can be used to generate or record music and/or sound effects. The sound chip 334 is feed by internal speakers, an external speaker connection, and internal and external microphones. In addition, a zoom video port feeds into a codec chip 332 which is connected to the sound chip set 334. The codec chip 332 is a digital to analog converter.

The modem chip set 342 is connected to a DAA daughter card 336, a modem codec 340, and a voice codec 346 which also connects to the microphones and speakers. The DAA daughter card 336 is an adapter that allows the modem 342 to adapt to many different types of telecommunications around the world without modification to the modem 342 itself.

The super I/O (input/output) chip set 344 is connected to a set of buffers 338, a floppy disk drive, an IDE hard disk drive, and serial and parallel ports. In addition, a second serial port is connected to a Serial Infrared (SIR) device. This SIR device has an interface chip which uses a 3.6864 Mhz oscillator. The SIR port can be used to communicate serial data to other computers or peripherals equipped to either receive or transmit SIR data.

The programmable logic device (PLD) 348 controls many proprietary functions of the computer. For example, the PLD 348 controls the IDE interface to the media bay module which may include a CD-ROM player, an additional hard disk or other peripherals devices. In addition, if the media bay module is a floppy disk drive, the PLD 348 will route the communications to the super I/O chip 344.

The P160 350 is a board-to-board connector that connects the bottom printed wiring board to the top printed wiring board.

The sound chip set 334, the modem chip set 342, and the super I/O chip set 344 are all connected to the interrupt (IRQ), the SA (ISA address bus), and the SD (ISA data bus) lines.

Figure 5:
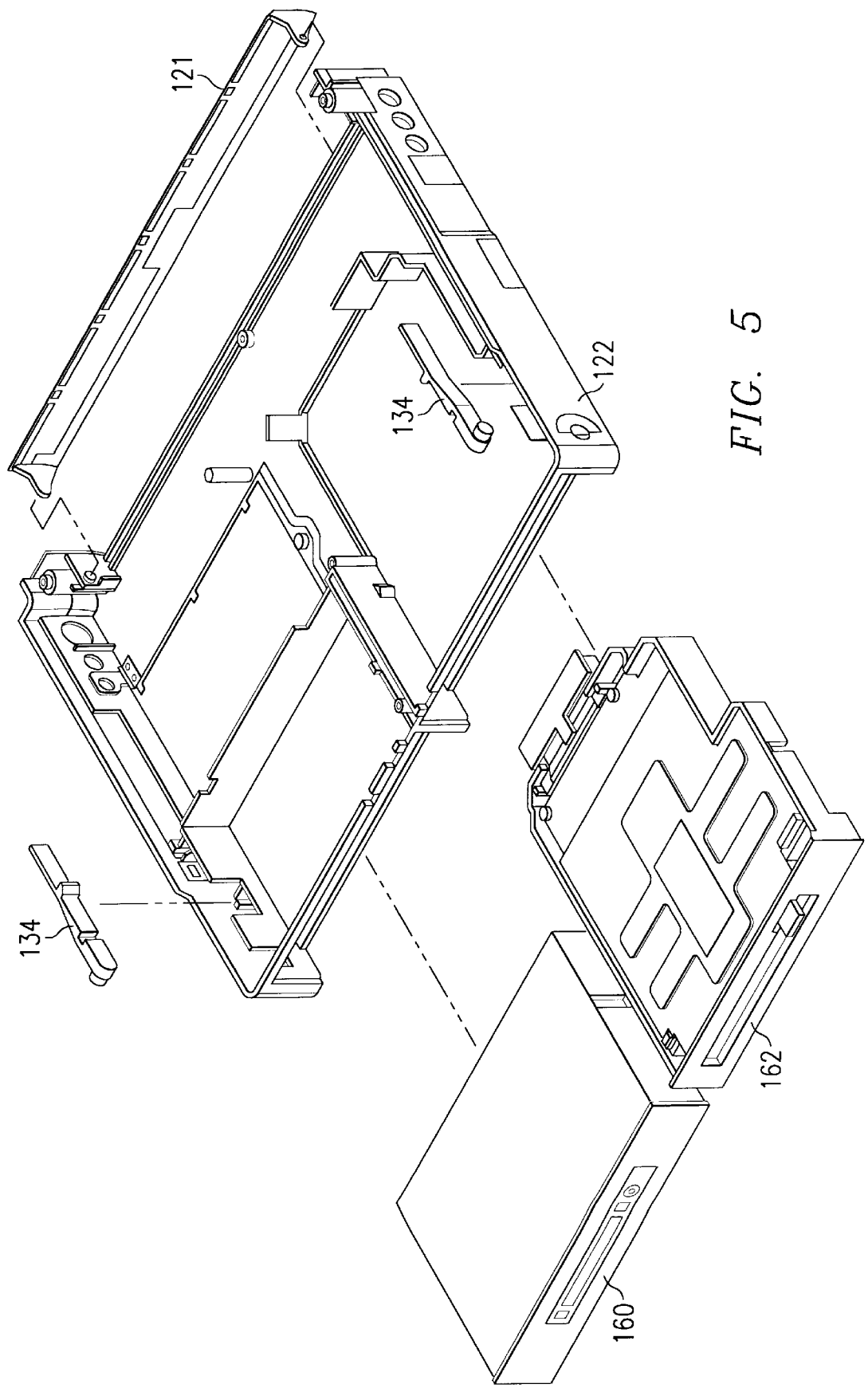
FIG. 5 is a close-up of the base of the portable computer.

FIG. 5 depicts more detail of the media bay module 162, the release mechanism 134 and the computer base 122. However, the release mechanism in this figure is just one embodiment of many possible implementations. In addition, the connector door 121 and the battery pack 160 are also shown. Another embodiment is shown in patent application TI-22746 (incorporated by reference).

As stated earlier in relation to FIG. 4, the media bay module is implemented as a secondary IDE controller in a programmable logic device (PLD). When a device is inserted into the media bay, the PLD generates a signal (SMI) to allow the basic input/output system (BIOS) to detect the insertion of the device. The PLD also provides a device identification (ID) register that holds the ID of the inserted device. The ID is 4 bits long identifying one of 16 possible media bay devices. When the bay is empty, the ID is 1111.

The PLD also provides electrical switches (Q-buffers) to connect or disconnect all signals to the device in the bay. These switches are under software control through a register in the PLD. The BIOS can disable those signals, effectively disconnecting the device from the rest of the system. The ID bits and power and ground signals to the media bay device are not controlled by Q-buffers.

The preferred embodiment of the media bay also includes a locking mechanism that prevents accidental removal of a media bay device while it is in use. This locking mechanism can be implemented as a solenoid that blocks the movement of the media bay latch. The locking mechanism can be controlled by a register in the PLD. The PLD could thus indicate if the mechanism is locked or unlocked using bits in a locking mechanism status register.

The media bay also includes a media bay LED (not shown) that gives the user visual feedback that the solenoid is locked and the device is in use. The LED is software controlled.

Software Control for Module Latch and Release

The software programs involved in the control of the media bay fall into one of four categories: BIOS, Operating System, Device Drivers, and Applications. Media bay operation is highly dependent on the operating system running on the computer.

A PnP operating system like Windows 95™ takes full advantage of the media bay features and offers the most flexibility in insertion and removal of media bay devices. Windows 95™ supports event notification and dynamically loadable virtual device drivers (VxD). This allows devices to be hot plugged into the computer without the need for closing applications or rebooting. Upon insertion, the user only sees a small delay (hourglass) and then automatically a new drive letter for the drive inserted appears.

The present invention, the Media Bay Monitor, is an application that manages the Media Bay, providing status and coordinating the removal of Media Bay Devices with Windows 95™. The present invention can be implemented as a Windows 95™ application that provides the user with an easy and safe way to remove devices from the media bay.

Other operating systems that do not support PnP, like Windows for Workgroups™ and DOS™, require the user to reboot in order to change media bay devices.

Operation Under Windows 95™

The Media Bay Monitor appears as a miniature icon on the toolbar. When the icon is double clicked, the Media Bay Monitor shows status of the Media Bay, and presents the option to remove the media. If removing the Media Bay Device is desired, the Media Bay Monitor initiates the removal with BIOS. The Media Bay Monitor waits for messages from BIOS indicating that a Media Bay Device has been or is in the process of being removed. The Media Bay Monitor pops up a dialog box warning that the Media Bay Monitor should be used to properly remove media.

Figure 6:
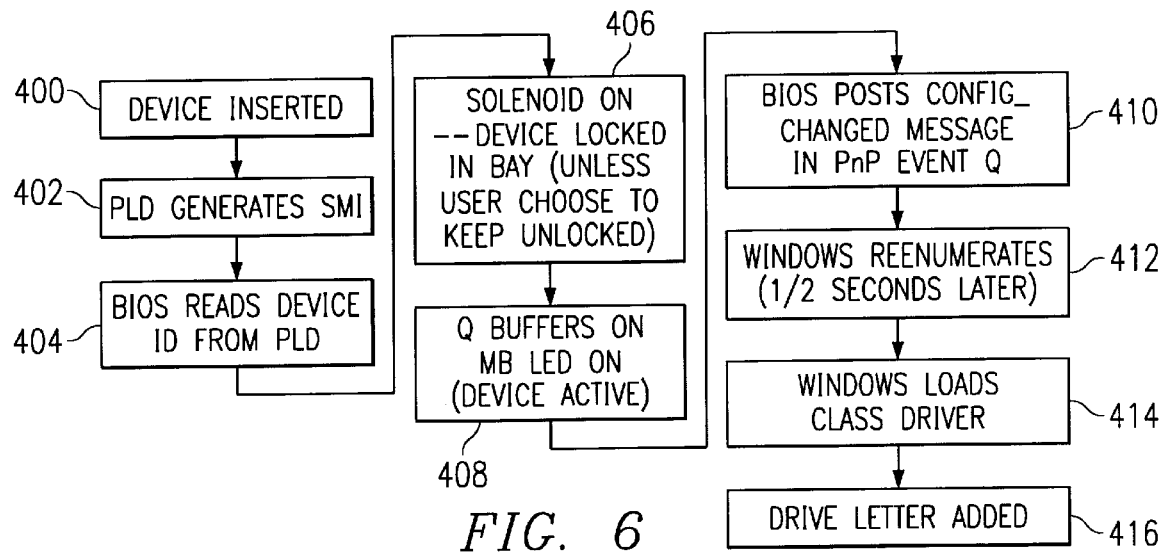
FIG. 6 is a flowchart insertion of the Media Bay module

FIG. 6 details insertion of the Media Bay module. When a device is inserted into the Media Bay (MB) (block 400), the PLD will generate a system management interrupt (SMI) as soon as the Device ID is valid (block 402) and the latch switch is released. The MB SMI bit in the "SMI cause status and clear SMI" register (Port E1) should be cleared to allow further MB SMI interrupts.

The solenoid can be turned on to lock the device into the Media Bay, provided the user has not set an option in CMOS memory (Device_Always_Unlocked) to keep the solenoid unlocked (block 406).

After locking the device if necessary, the Q-Buffers for the appropriate device are turned on, and the Media Bay LED is turned on. The device is now active (block 408).

BIOS will then post a CONFIG_CHANGED message in the PnP Event Q (block 410). Windows 95™ will receive this message and re-enumerate all devices (block 412). When the new device is found, Windows 95™ will load the class driver for it (block 414), assign a drive letter (block 416), and the device will be available to use.

Media Bay Device Removal

Removing a media bay device while it is active may result in data corruption on the drive or electrical damage. Applications may have open files on the device even if it does not appear to be working. It is therefore important to ensure that applications are not actively using the drive to be removed.

The user has the option to disable the locking of the Media Bay Device. If the device is not locked the Media Bay Monitor will warn the user that he may corrupt his data.

Figure 7:
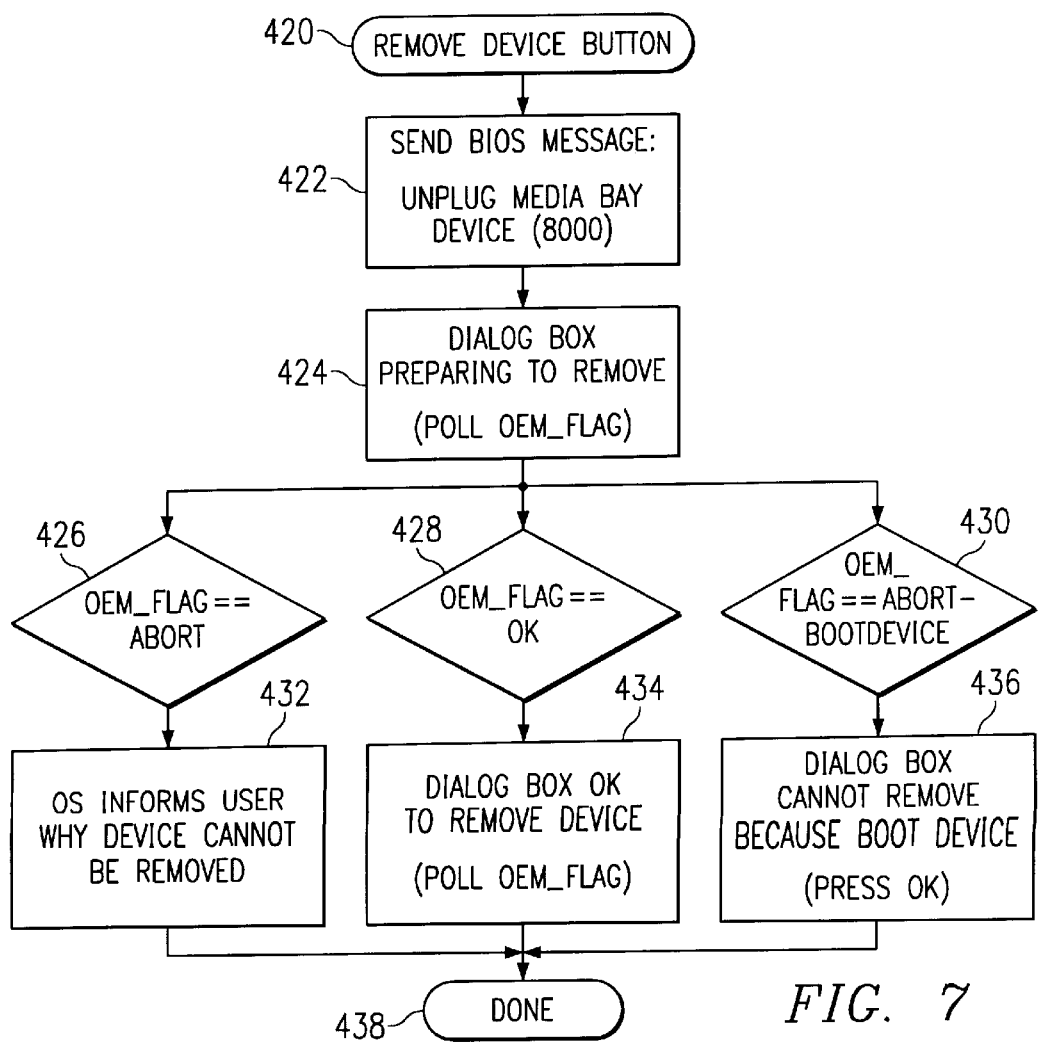
FIG. 7 is a flowchart of removal of the Media Bay module.

FIG. 7 shows a flowchart of how the Media Bay Monitor removes a device. When it is desired to remove the Media Bay Device, the user should engage the Media Bay Monitor's icon on the tool bar. This will bring up a dialog box showing the status. On this dialog box, there is a button to remove the Media Bay Device (block 420). This button (block 420) will cause the Media Bay Monitor to call BIOS PnP Function 4 (SendMessage) passing the OEM Defined message "Unplug Media Bay Device" (0x8000) (block 422).

Next, a dialog box (block 424) appears saying we are waiting for the system to prepare to remove the device. While the dialog box is running, the Media Bay Monitor is polling OEM_FLAG waiting for it to change to OK, or CANCEL.

If a CANCEL is received (block 426) instead of an OK while waiting for the OS to prepare for device removal, the OS has determined that device should not be removed. The OS will inform the user why the device cannot be removed (block 432) (per Plug and Play BIOS Specification).

If a CANCEL-BOOTDEVICE (block 430) is received instead of an OK while waiting for the OS to prepare for device removal, the BIOS will not let the device to be changed because it is the boot device (block 436).

If OEM_FLAG changes to OK (block 428), it is OK to remove the Media Bay Device. BIOS has already turned off the Q-Buffers, unlocked the solenoid, and turned off the Media Bay LED. A dialog box is then displayed telling the user it is OK to remove the Media Bay Device (block 434).

The Media Bay Monitor then polls OEM_FLAG again (block 434) waiting for it to be cleared indicating that the Media Bay Device has been removed. The process is complete once the OEM_FLAG has been cleared (block 438).

Figure 8:
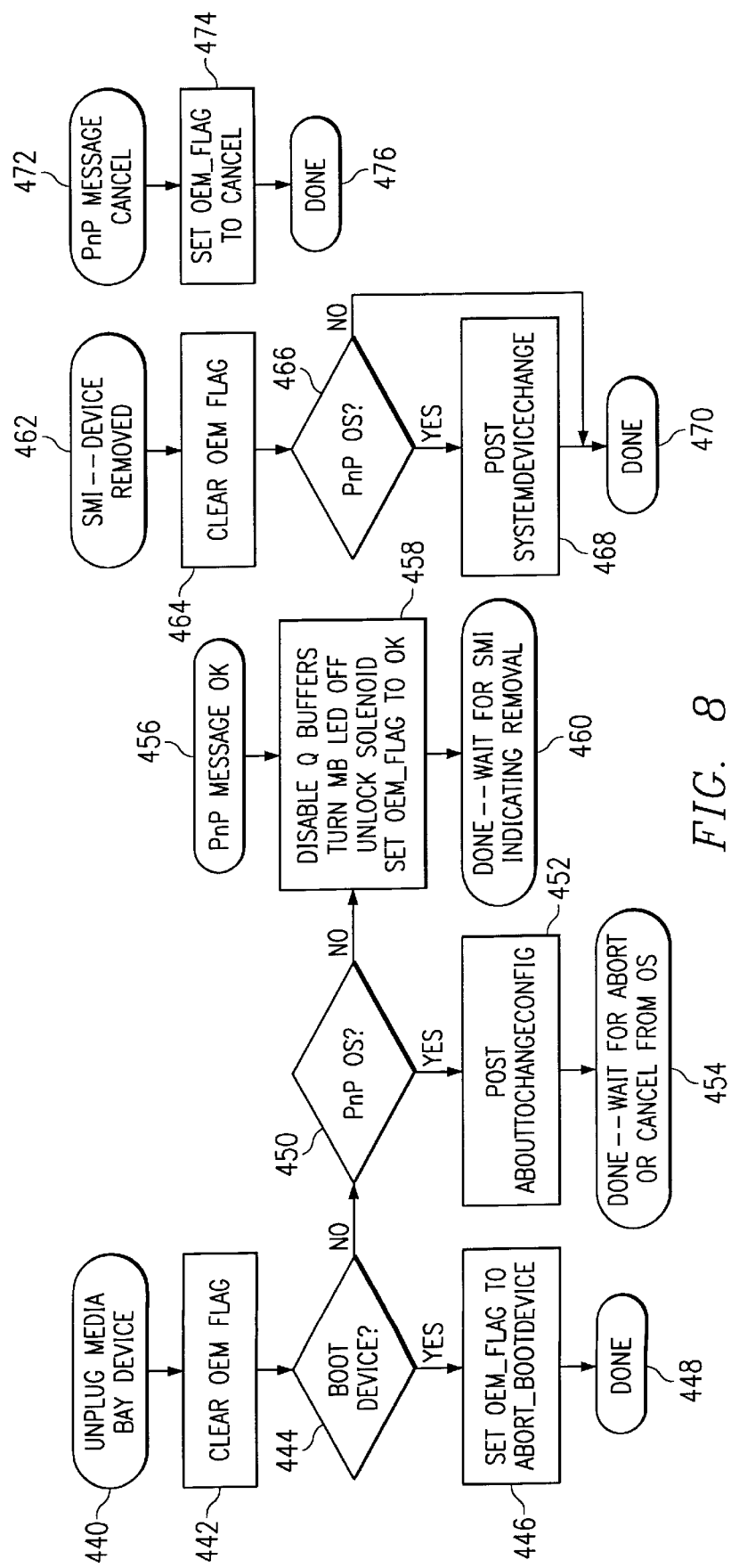
FIG. 8 is a flowchart of how the BIOS removes a device.

FIG. 8 shows a flowchart of how the BIOS removes a device. When a user presses the "Remove Device" button on the Media Bay Monitor, the BIOS's PnP Function 4 (SendMessage) will be called with the OEM defined message "Unplug Media Bay Device" (0x8000) (as shown and described in FIG. 7). When the Unplug Media Bay Device message is received (block 440), BIOS will first clear the OEM_FLAG (block 442). On a PnP OS, BIOS will post a ABOUT_TO_CHANGE_CONFIG message in the PnP Event Q (block 452). On a non-PnP OS, BIOS will prepare the device to be removed by turning off the Q Buffers, LED and unlock the Solenoid (block 458). The OEM_FLAG will also be set to OK indicating to the Media Bay Monitor it is OK to tell the user to remove the Media Bay Device (block 454).

When the OS receives the ABOUT_TO_$_{CHANGE\_}$ CONFIG message (block 452), it polls applications to make sure it is OK to remove the device. If everything is OK it will call BIOS's PnP Function 4 (SendMessage) passing OK (block 456). If the OS doesn't want the device to be removed, CANCEL will be sent to the BIOS (block 472).

When BIOS Receives the OK message (block 456), the Media Bay Device will be prepared for removal by turning off the Q Buffers, LED and unlock the Solenoid (block 458). The OEM_FLAG will also be set to OK indicating to the Media Bay Monitor it is OK to tell the user to remove the Media Bay Device (block 460).

After the Media Bay Monitor sees the OEM_FLAG go to OK, it will inform the user that the Media Bay Device can be removed. When the device is removed, an SMI is generated by the hardware (block 462).

When the SMI is received (block 462), the OEM_FLAG is cleared (block 464), and if we are in a Plug and Play OS, BIOS will then post a SYSTEM_DEVICE_CHANGED message in the PnP Event Q (block 468) and the process is complete (block 470).

If BIOS receives a CANCEL message (block 472) instead of the OK message, the OEM_FLAG will be set to CANCEL (block 474), and the process is complete (block 476).

Operation Under Non PnP Operating Systems

The operating system under this category are DOS™, Windows for Workgroups™ (WFW), OS/2™ and others. Presently, these operating systems do not support Plug and Play, event notification, or dynamically loadable virtual device drivers. All the peripherals in the system must be present before the operating system is loaded and must remain unchanged. The operation of the media bay under these operating system is "cold " insertion and removal. BIOS must identify and record in CMOS memory the relevant device parameters before the OS is loaded. This is done in the system setup. To insert or remove a media bay device, the user must perform the following operations:

Close all applications

Shut down the operating system

Power off the computer

Insert/Remove media bay device

Power on the computer and press F2 at the setup prompt

Configure media bay device parameters

Restart OS and applications

Operation Under Different Power States

Figure 9:
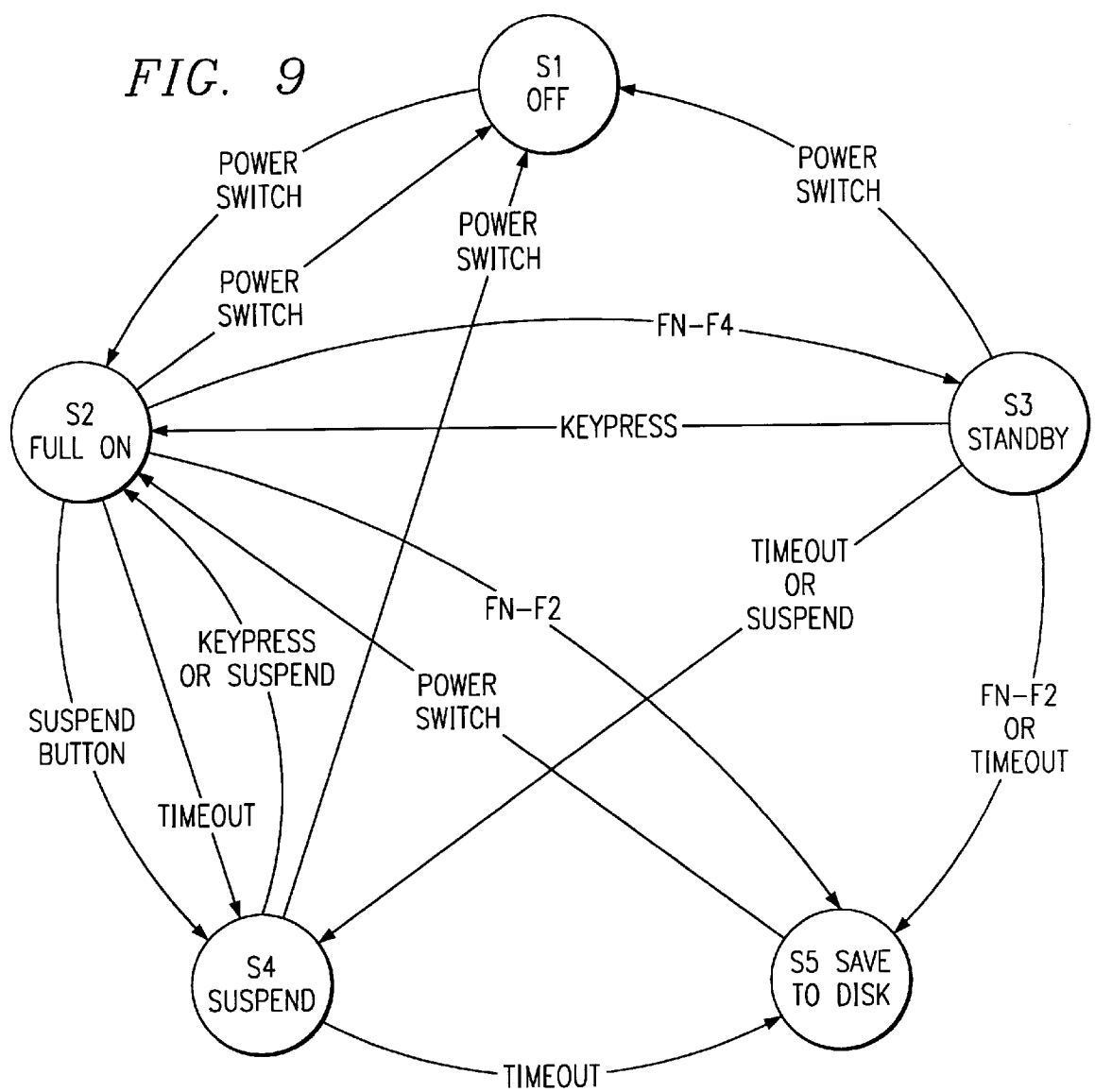
FIG. 9 is a diagram of the power states of the computer.
Figure 10:
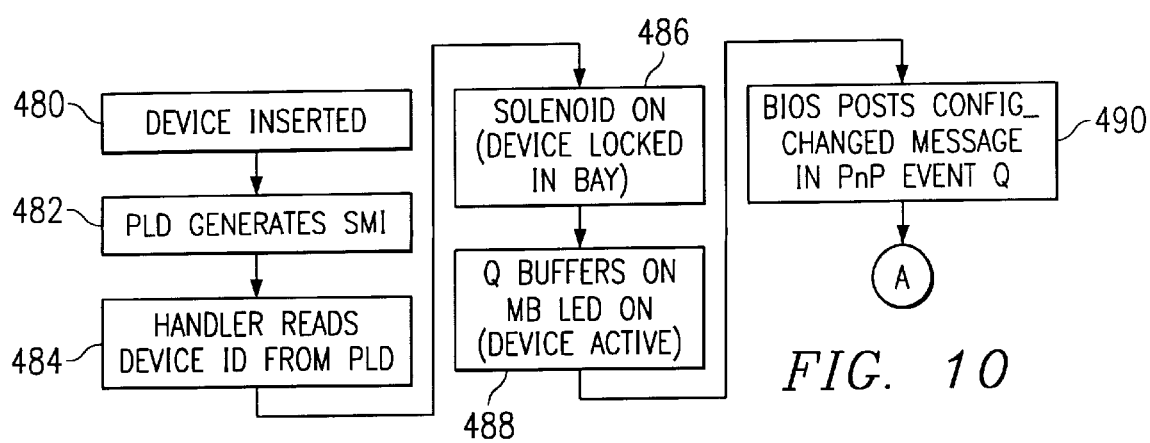
FIG. 10 is a flowchart of inserting a device one of the power states of the computer depicted in FIG. 9.

FIG. 9 shows the power states of the computer. Device insertion/removal is discussed in each of these states and during transitions from one state to another.

S1—OFF State

In this state, the user can insert or remove any media bay device safely since all applications have been closed and power is not applied to the media bay. An important consideration is that the solenoid must be in the unlocked position (latch open) when the computer is off. If the solenoid is locked while the bay is empty, the latch will be blocked and the user may force the device into the bay and damage the latch or solenoid mechanism. To ensure that the solenoid is open, every path leading to this state must unlock the latch first (there is one exception to this requirement discussed at the end of this section). As shown above, transitions from any of three states can lead to this state. These are FULL ON (S2), STANDBY (S3), and SUSPEND (S4).

The user can get to the OFF state from any of the above states by pressing the power switch. This is a "soft" switch which allows BIOS to unlock the latch then power down the system. If the user gets to the OFF state by removing the battery or AC power plug instead of pressing the power switch the solenoid will be left in the locked position while the unit is off. The user will not be able to swap devices even though the computer is powered off. There is no mechanical override (e.g. paper clip hole) to unlock the solenoid. A "proper_shutdown" flag in CMOS will allow the user to unlock the solenoid by restarting the machine. A post procedure can examine this flag and unlock the solenoid if necessary. However, it may be desirable to leave the device locked when the computer is off as a safety feature for units on display in stores. A CMOS option (Device_Locked_ When_Off) will prevent a customer from powering off the unit and "borrowing" the disk drive (the CMOS configuration may be protected with a password).

S2—FULL ON State

In this state, if the media bay is occupied with a battery, the solenoid is unlocked and the user can remove it freely. Inserting a device into the bay in this state will cause the sequence of operations depicted in FIG. 10. First, the device is inserted (block 480). The PLD then generates the SMI (block 482). The handler then reads the device ID from the PLD (block 484). The solenoid then gets turned on (block 486). The Q buffers and MB LED then get turned on. Finally, the BIOS posts a config_changed message in the PnP Q. After point A, the operation is OS dependent.

If the OS is PnP compliant, the OS will receive this message and reenumerate all devices. When the new device is found, the OS will load the class driver for it, assign a drive letter, and the device will be available to use.

If the OS is not PnP compliant, the event is ignored and the drive is not recognized. Alternatively, the SMI handler can check the PnP_OS CMOS flag and display a message to the user before turning on the Q buffers, and LED. A transition to this state exists from 4 other states; these are: OFF, STANDBY, SUSPEND, and SAVE TO DISK.

From the OFF state: Enumeration at startup under a PnP device would have discovered the media bay device and loaded proper drivers for it. Under a non PnP OS, setup would have the relevant drive parameters.

From the STANDBY state: A key press would have returned the computer to FULL on. The solenoid remains locked in standby and the bay device cannot be removed.

From the SUSPEND state: A key press would also return the computer to the FULL ON state. The solenoid remains locked in suspend and the bay device cannot be removed. Upon resuming from a suspended state, a reenumeration is performed, but the media bay device is unchanged.

From the SAVE TO DISK state: Pressing the power switch returns the computer to the FULL ON state. The solenoid is unlocked in SAVE TO DISK and the bay device may have changed. Upon resuming from a saved configuration, the BIOS must verify that the computer has not changed (e.g. the user is not using the disk in a computer with more memory, different display type etc.).

S3—STANDBY State

There is only one way to get to this state—pressing FN-fx. In this state the display is blanked, but applications are still active so the solenoid is locked and the media bay LED is on to signal the device is in use.

S4—SUSPEND State

In this state, applications are not active, but the solenoid is in the locked position to prevent error messages resulting from changing the media bay device and attempting to resume a previous application in DRAM.

S5—SAVE TO DISK State

In this state, applications are not active, and power to the computer is off; the solenoid is in the unlocked position. This allows the user to take out the media bay device for security or other reasons. When the unit is powered back on, POST must ensure that a resume operation from the disk drive is about to be performed on the right computer by storing the media bay drive serial number or a checksum of it in CMOS before a save to disk operation is performed.

Options

Media Bay Password

In order to prevent anyone from being able to just walk up to the computer and remove the Media Bay Device, the Media Bay Monitor can password protect the "Remove Device" button. The Media Bay Monitor will ensure that the CMOS variable Device_Locked_When_Off is true when Media Bay Passwords are used. BIOS will look at Device_Locked_When_Off when powering down and ensure that the Device is locked when powered down.

Media Bay Always Unlocked

There is an option stored in CMOS "Device_Always_Unlocked" that prevents the Media Bay Device from ever being locked. This CMOS location must be checked in the BIOS before locking the Media Bay Device.

SMI Generation

Figure 11:
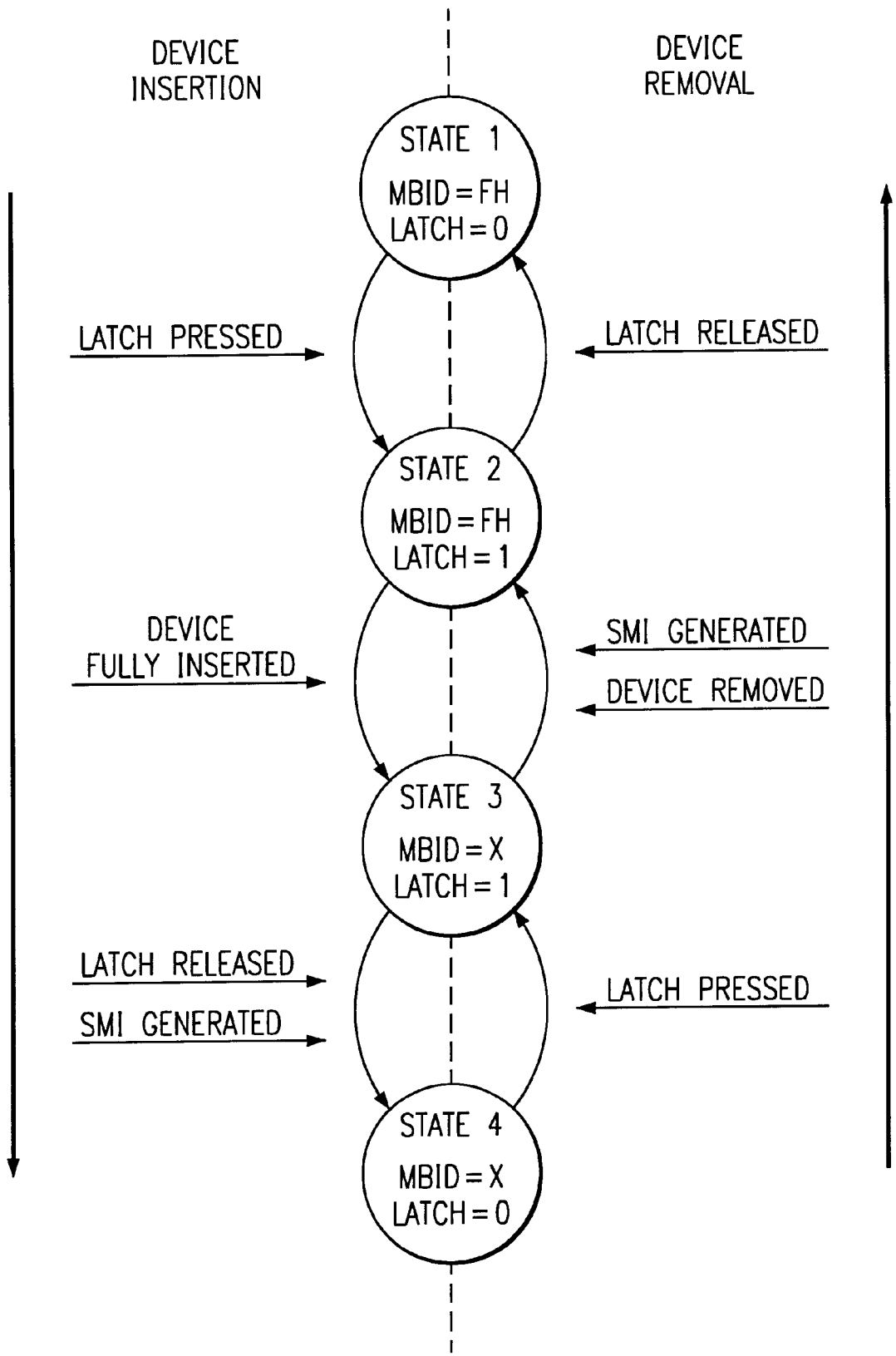
FIG. 11 is a chart depicting the generation of the Media Bay SMI.

FIG. 11 shows the generation of the Media Bay SMI.

State 1

State 1 is when the Media Bay is empty or contains a battery (MBID==F) and the Latch is not pressed. This is the normal state when the Media Bay is empty. Once the Latch is pressed we transition to State 2.

State 2

State 2 is when the Media Bay is empty or contains a battery (MBID==F) and the Latch has been pressed. If the Latch is released we transition to State 1. If a Media Bay Device is inserted in the Media Bay, we transition to State 3.

State 3

State 3 is when there is a Media Bay Device in the Media Bay (MBID==x) and the Latch is pressed. If the Latch is released, an SMI is generated as we transition to State 4. If the Media Bay Device is removed, an SMI is generated as we transition to State 2.

Because leaving State 3 will generate an SMI going to State 2 or State 4, the SMI handler must know if a Media Bay Device is currently installed or not.

If a Media Bay Device is not installed when the SMI is received, and the MBID is valid, a new device was inserted. The Q Buffers should be turned on and the OS should be notified about the new device. If an SMI is received and the MBID is 0xF, the SMI can be ignored.

If a Media Bay Device is installed when an SMI is received, and if the MBID is valid, the device has been removed. The Q Buffers should be turned on and the OS should be notified about the removal. If we receive an SMI and the MBID is valid, the SMI can be ignored.

Note that under normal operation when the Media Bay Monitor is used, BIOS is expecting an SMI when a Media Bay Device is removed and will have already turned off the Q Buffers, and the OS will already have removed the Device Drivers.

State 4

State 4 is when there is a Media Bay Device in the Media Bay (MBID==x) and the Latch is not pressed. This is the normal state when a Media Bay Device is installed.

Solenoid Power Up State

When Reset is applied to the hardware, the solenoid is unlocked. The POST code will look at the CMOS Variable "Device_Always_Unlocked". If this variable is not set, the solenoid will be locked if a device is present.

Solenoid Not Present

There may not be a solenoid present. The status bit "Solenoid Present" can be read from the PLD to determine if the solenoid is present. The solenoid not being present causes exceptions to the normal operation of the Media Bay Monitor:

1. Surprise Removal of the Media Bay Device

If the solenoid is not present to lock the Media Bay Device, it is possible for the user to eject the Media Bay Device without first informing the OS. If the Media Bay Device is ejected without using the Media Bay Monitor, the BIOS has no choice but to turn off the Q-Buffers and inform the OS "SYSTEM_DEVICE_CHANGED".

The Media Bay Monitor will notice the device was removed and pull up a dialog box informing the user he should use the "Remove" button on the Media Bay Monitor to remove devices to avoid probably loss of data and possible damage to Media Bay Devices.

2. Media Bay Password

Since the Media Bay Device cannot be locked, the Media Bay Password protection cannot be enabled. The Password Protection will not be presented in the Media Bay Monitor—the user will not know it is even possible with proper hardware. The Media Bay will ensure that the CMOS variable Device_Locked_When_Off is FALSE.

3. Solenoid Status Available

If the solenoid is not present, the "Solenoid Status Available" and the "Solenoid Status" flag should indicate so.

Software Implementation Under Windows 95™

Figure 12:
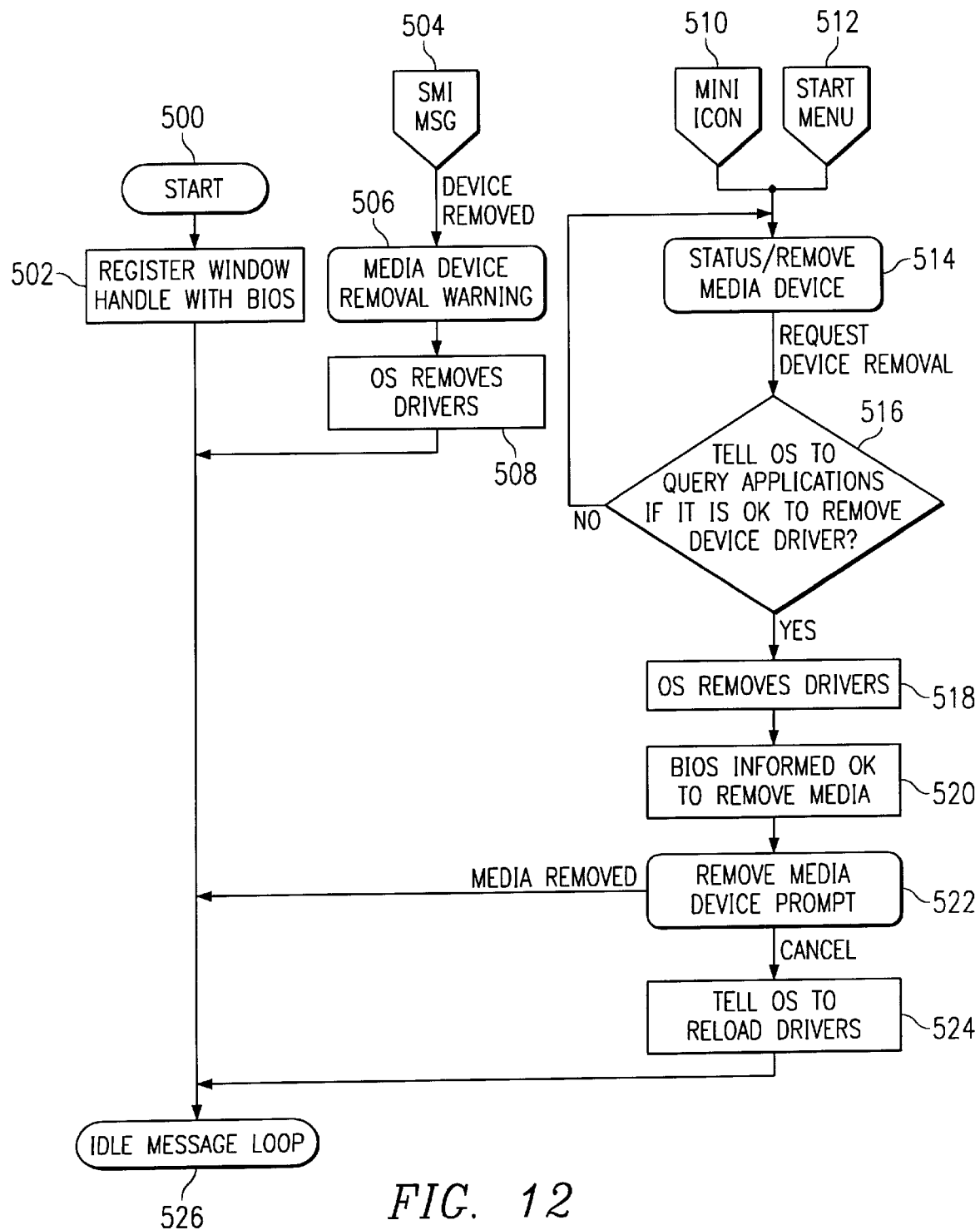
FIG. 12 is a flowchart of the software implemented under the Microsoft™ Windows 95™.

FIGS. 12–16 will be used to describe the implementation of the Media Bay Monitor under the Microsoft™ Windows 95™ operating system. FIG. 12 shows the detail of how the software can be implemented under the operating system, and FIGS. 13–16 show dialog boxes that interact with the user. Reference will be made to the blocks in FIG. 12 and also to the dialog boxes in the following description.

Figure 13:
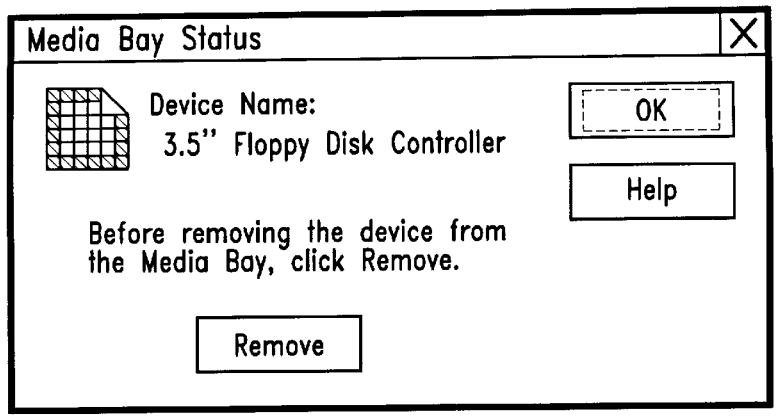
FIGS. 13–16 are dialog boxes of the Media Bay Monitor.

When the Media Bay Monitor is launched (block 500 and block 502), it creates a "Notification Icon" (Mini Icon) (block 510) on the Task Bar and waits for WM-DEVICECHANGE Notification Messages or user actions. When it is desired to remove Media Bay Devices, the Media Bay Monitor should be used. The Media Bay Monitor will initiate the process by telling BIOS to remove the device. Removing Media Bay Devices can be initiated two ways: the icon (block 510) on the tool bar can be double-clicked activating the Media Bay Monitor; or the Media Bay Monitor can be run from the Start Menu (block 512). Either of these actions will cause the Media Bay Monitor to display the "Media Bay Status" dialog box (FIG. 13). This shows the status of the Media Bay, and if a Media Bay Device is present, the "Remove Device" button is enabled to allow the removal of the Media Day Device.

After the "Remove Device" button is pressed, the Media Bay Monitor tells BIOS to post an ABOUT-TO-CHANGE-CONFIG message. When the OS receives this message it will poll all applications asking if it is OK to remove the device (block 516). If all applications agree, the device driver can be removed (block 518) and the OS will inform BIOS to continue (block 520). The Media Bay Monitor displays a dialog box "Removing Device Driver" (FIG. 16), and waits for the BIOS to be informed to proceed.

Figure 14:
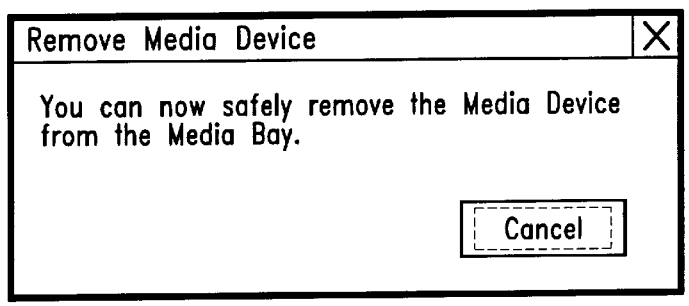
Figure 15:
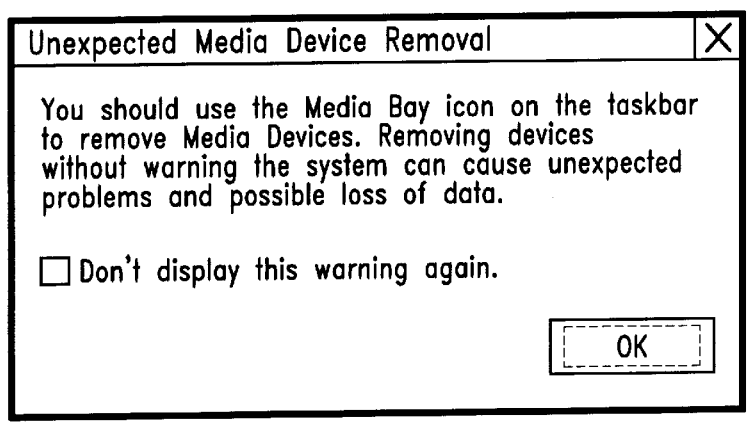
Figure 16:
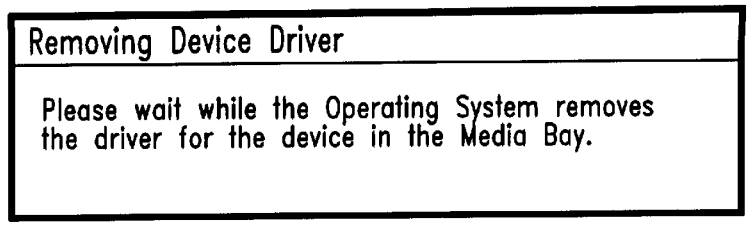

Once the BIOS has been informed to proceed, the Media Bay Monitor will display the "Remove Media Device" dialog box (FIG. 14). If BIOS is informed to cancel, the user is informed why, and the "Media Bay Status" dialog box (FIG. 13) reappears.

The "Remove Media Device" dialog box (FIG. 14) watches the Media Bay waiting for the Media Bay Device to be removed. Once the Media Bay Device is removed the dialog box disappears. The Media Bay Monitor then goes to it's Idle Message Loop (block 526) waiting for the next event.

While waiting for the Media Bay Device to be removed, the user can press the cancel button. If the cancel button is pressed, the OS is told to reload the Device Drivers (block 524) and we return to the "Media Bay Status" dialog box (FIG. 13).

Media Removed Without Using Media Bay Monitor

When the Media Bay Latch is pressed, an SMI interrupts and BIOS posts a SYSTEM-DEVICE-CHANGED to the OS. The OS will then post a WM-DEVICECHANGE message to all Apps. When the message is received by the Media Bay Monitor, the wParam is checked for DBT-DEVICEREMOVEDCOMPLETE. If the Media Bay Device has been removed, the Media Bay Monitor displays the "Unexpected Media Device Removal" dialog box (block 506) (FIG. 15), and the OS removes the drivers (block 508).

Media Bay Monitor Summary

The following table summarizes specific conditions, events and results under both, PnP and non-PnP operating systems.

| OS | INITIAL CONDITIONS | EVENT | SMI | RESULT |
|---|---|---|---|---|
| PnP (Win 95) | Media bay empty | User moves latch | No | No effect on running software |
| | • Disk in Media Bay<br>• No active I/O to disk | User moves latch to remove | Yes | • BIOS turns Q buffers off<br>• Media Monitor notified (INT15)<br>• Warning message displayed<br>• config_changed message posted in PNP Q<br>• 0.5 seconds later, Windows reenumerates, removes drive |
| | • Disk in Media Bay<br>• Files open on disk<br>• No active I/O to disk | User moves latch to remove drive | Yes | • BIOS turns Q buffers off<br>• Media Monitor notified<br>• Warning message displayed<br>• config_changed message posted in PNP Q<br>• 0.5 seconds later, Windows reenumerates, attempts to close files-fails, "Media error on drive D retry - cancel"<br>• Possible recovery path if drive is reinserted<br>• Possible data corruption<br>• (unflushed caches, file buffers lost.) |
| PnP (Win 95) | • Disk in Media Bay<br>• Files open on disk<br>• Active I/O to disk | User moves latch to remove drive | Yes | • BIOS turns Q buffers off<br>• Media Monitor notified<br>• Warning message displayed<br>• config_changed message posted in PNP Q<br>0.5 seconds later, Windows reenumerates, attempts to close file - fails, "Media error in drive D retry - cancel"<br>• No recovery if drive reinserted<br>• Data corruption unflushed caches, |
| | • Disk in Media Bay<br>• Files open Monitor icon on disk<br>• Active I/O method) to disk | User initiates media change from Media (recommended | No | • Media Monitor informs BIOS (INT15 interface)<br>• BIOS posts about_to_change message in PnP Q<br>• Windows closes all files and terminates apps using drive<br>• Window responds with ok or abort<br>• If ok BIOS turns Q buffers, LED off |
| Non PnP (DOS, Win 31) | Media bay empty | User moves latch | No | No effect on running software |
| | • Disk in Media Bay<br>• No open files on disk<br>• No active I/O to disk | User moves latch to remove drive | Yes | • BIOS turns Q buffers and, LED off<br>• OS reports error on subsequent access<br>• Possible recovery path if drive is reinserted<br>• No data corruption |
| | • Disk in Media Bay<br>• Files open on disk<br>• No active I/O to disk | User moves latch to remove drive | Yes | • BIOS turns Q buffers off<br>• No Possible recovery path if drive is reinserted (current file pointers lost on init)<br>• Data corruption unflushed caches, file buffers lost). |

While this invention has been described with reference to being implemented on a notebook computer, this description is not intended to be construed in a limiting sense. In addition, various modifications and combinations of the illustrative embodiments, as well as other embodiments of the invention, will be apparent to persons skilled in the art upon reference to the description. Words of inclusion are to be interpreted as nonexhaustive in considering the scope of the invention. Various modifications and combinations of the illustrative embodiments, as well as other embodiments of the invention, will be apparent to persons skilled in the art upon reference to the description. For example, the locking mechanism some other type of lock which can be activated by the computer. In addition, the media bay has many other variations not listed in this description. The dialog boxes and software code can be altered and still follow the spirit of the invention. It is therefore intended that the appended claims encompass any such modifications or embodiments.

Software Code Used in Implementation

The following software programs are used in the preferred embodiment under a Microsoft™ Windows 95™ environment, but can be changed to operate under different operating systems.

| Name of Program | : purpose |
|---|---|
| AboutDlg.h | : header file |
| AboutDlg.cpp | : implementation file |
| MainWnd.cpp | : implementation file |
| MainWnd.h | : header file |
| MBMon.clw | : CLW file contains information for MFC ClassWizard |

-continued

| Name of Program | : purpose |
|---|---|
| MBMon.cpp | : Defines the class behaviors for the application. |
| MBMon.h | : main header file for the MBMON application |
| MBMon.rc | : Microsoft ™ Developer Studio generated. |
| MBMon.rc2 | : MBMON.RC2 - resources Microsoft ™ Visual C++ |
| RemoveMedia.cpp | : implementation file |
| RemoveMedia.h | : header file |
| RemovingDriyer.cpp | : implementation file |
| RemovingDriver.h | : header file |
| resource.h | : Microsoft ™ Developer Studio generated indude file. |
| SMIDlg.cpp | : implementation file |
| SMIDlg.h | : header file |
| stdafax.cpp | : source file that includes just the standard includes |
| stdafx.h | : include file for standard system include files, |
| stdtypes.h | : from Windows.h |
| TISYS.H | : header file for interface to OS |

Software Code listings:

```
***********************************************************************
*   AboutDlg.h                                                         *
***********************************************************************
// AboutDlg.h : header file
//
class CAboutDlg : public CDialog
{
public:
        CAboutDlg();

// Dialog Data
        //{{AFX_DATA(CAboutDlg)
        enum { IDD = IDD_ABOUTBOX };
        //}}AFX_DATA // ClassWizard generated virtual function overrides
        //{{AFX_VIRTUAL(CAboutDlg)
        protected:
        virtual void DoDataExchange(CDataExchange* pDX);    // DDX/DDV support
        //}}AFX_VIRTUAL // Implementation
protected:
        //{{AFX_MSG(CAboutDlg)
        //}}AFX_MSG
        DECLARE_MESSAGE_MAP()
};
```

```
****************************************************************
*  AboutDlg.cpp                                                 *
****************************************************************
// AboutDlg.cpp : implementation file
// include "stdafx.h"
include "MBMon.h"
#include "aboutdlg.h"

#ifdef _DEBUG
define new DEBUG_NEW
#undef THIS_FILE
static char THIS_FILE[] = __FILE__;
endif /////////////////////////////////////////////////////////////////
// CAboutDlg dialog used for App About BEGIN_MESSAGE_MAP(CAboutDlg, CDialog)
        //{{AFX_MSG_MAP(CAboutDlg)
                // No message handlers
        //}}AFX_MSG_MAP
END_MESSAGE_MAP()

CAboutDlg::CAboutDlg() : CDialog(CAboutDlg::IDD)
{
        //{{AFX_DATA_INIT(CAboutDlg)
        //}}AFX_DATA_INIT
} void CAboutDlg::DoDataExchange(CDataExchange* pDX)
{
        CDialog::DoDataExchange(pDX);
        //{{AFX_DATA_MAP(CAboutDlg)
        //}}AFX_DATA_MAP
}
```

```
************************************************************************
*  MainWnd.cpp                                                         *
************************************************************************
// MainWnd.cpp : implementation file
// include "stdafx.h"
include "DBT.H"
#include "MBMon.h"
#include "MainWnd.h"
#include "SMIDlg.h"
#include "RemoveMedia.h"
#include "RemovingDriver.h"
#include "AboutDlg.h"

#define IDB_DONE       100
#define IDB_HELP101
define IDB_REMOVE     102 define BUTTON_DX    75
define BUTTON_DY    24 ifdef _DEBUG
define new DEBUG_NEW
#undef THIS_FILE
static char THIS_FILE[] = __FILE__;
endif /////////////////////////////////////////////////////////////////////////
// CMainWnd CMainWnd::CMainWnd()
{
        m_wLastMediaType = MB_GetDeviceType();

//    Load Bitmaps
        m_bmFloppy.LoadBitmap(IDB_FLOPPY);
        m_bmCDRom.LoadBitmap(IDB_CDROM);
        m_bmHardDrive.LoadBitmap(IDB_HARDDRIVE);
        m_bmNone.LoadBitmap(IDB_NONE);

//    Create Our Font
        m_fontMain.CreateFont(
```

```
                        14,                      //      Desired
    Height of font in logical units
                        0,                       //      Average
    width of font in logical units
 5                      0,                       //      Escapement
    Vector
                        0,                       //      Orientation
    Angle
                        FW_BOLD,                 //      Font Weight (inked
10  pixels/1000)
                        FALSE,                   //      Italic?
                        FALSE,                   //      Underlined?
                        FALSE,                   //      StrikeOut?
                        ANSI_CHARSET,            //      Character Set
15                      OUT_TT_PRECIS,           //      Output Precision
                        CLIP_DEFAULT_PRECIS,     //      Clip Precision
                        PROOF_QUALITY,           //      Quality
                        FF_ROMAN,                //      Pitch and
    Family
20                      "MS Sans Serif"          //      Typeface Name
                        );

m_bRemoveOK = FALSE;
    }
25
    CMainWnd::~CMainWnd()
    {
            m_fontMain.DeleteObject();
    }
30
    int CMainWnd::OnCreate(LPCREATESTRUCT lpCreateStruct)
    { if (CWnd::OnCreate(lpCreateStruct) == -1)
35                  return -1;

// Add "About..." menu item to system menu.
            // IDM_ABOUTBOX must be in the system command range.
            ASSERT((IDM_ABOUT & 0xFFF0) == IDM_ABOUT);
40          ASSERT(IDM_ABOUT < 0xF000);

CMenu* pSysMenu = GetSystemMenu(FALSE);
            CString sAbout;         sAbout.LoadString(IDS_MENUABOUT);
```

TI-22954    Page 31

```
        if (!sAbout.IsEmpty())
        {
              pSysMenu->AppendMenu(MF_SEPARATOR);
              pSysMenu->AppendMenu(MF_STRING, IDM_ABOUT, sAbout);
 5      }

//      Create Done, Help, Remove Buttons
        CString sButtonText;

10      sButtonText.LoadString(IDS_OKBUTTON);
        m_cntlDone.Create(sButtonText, WS_CHILD | WS_VISIBLE |
     BS_DEFPUSHBUTTON,
                    CRect(230, 8, 230+BUTTON_DX, 8+BUTTON_DY),
                    this, IDB_DONE);
15      m_cntlDone.SetFont(&m_fontMain);

sButtonText.LoadString(IDS_HELPBUTTON);
        m_cntlHelp.Create(sButtonText, WS_CHILD | WS_VISIBLE |
     BS_PUSHBUTTON,
20                  CRect(230, 38, 230+BUTTON_DX, 38+BUTTON_DY),
                    this, IDB_HELP);
        m_cntlHelp.SetFont(&m_fontMain);

sButtonText.LoadString(IDS_REMOVEBUTTON);
25      m_cntlRemove.Create(sButtonText, WS_CHILD | WS_VISIBLE |
     BS_PUSHBUTTON,
                    CRect(70, 95, 70+BUTTON_DX, 95+BUTTON_DY),
                    this, IDB_REMOVE);
        m_cntlRemove.SetFont(&m_fontMain);
30
        return 0;
     }

35   BEGIN_MESSAGE_MAP(CMainWnd, CWnd)
        ON_MESSAGE(ID_TRAYMSG, OnTrayMsg)
        ON_MESSAGE(WM_DEVICECHANGE, OnDeviceChange)     //
        Should be ON_WM_DEVICECHANGE (VC Bug!)
        ON_BN_CLICKED(IDB_DONE, OnDone)
40      ON_BN_CLICKED(IDB_HELP, OnHelp)
        ON_BN_CLICKED(IDB_REMOVE, OnRemove)
        //{{AFX_MSG_MAP(CMainWnd)
        ON_WM_PAINT()
        ON_WM_DESTROY()
```

```
            ON_WM_CLOSE()
            ON_WM_CREATE()
            ON_WM_SYSCOMMAND()
            //}}AFX_MSG_MAP
 5   END_MESSAGE_MAP()

//////////////////////////////////////////////////////////
     // CMainWnd message handlers 10   LONG CMainWnd::OnTrayMsg(UINT wParam, LONG lParam)
     {
            switch (lParam)
            {
15   //     case WM_LBUTTONDOWN :
     //            ShowWindow(SW_SHOW);
     //            AfxMessageBox("Left Button Down");
     //            ShowWindow(SW_HIDE);
     //            break;
20          case WM_LBUTTONDBLCLK :
                   ShowWindow(SW_SHOWNORMAL);
                   SetForegroundWindow();
                   break;
            }
25
            return 0;
     }

30   void CMainWnd::OnPaint()
     {
            CString sDeviceType = "Unknown";
            CPaintDC dc(this);

35   //     Print Graphics
            CDC SrcDC;
            SrcDC.CreateCompatibleDC(NULL);

MB_DeviceType DeviceType = MB_GetDeviceType();
40          switch (DeviceType)
            {
            case DT_FLOPPY :
                   SrcDC.SelectObject(&m_bmFloppy);
                   dc.BitBlt(4, 4, 23, 14, &SrcDC, 0, 0, SRCCOPY);
```

```
                sDeviceType.LoadString(IDS_DEVTYPEFLOPPY);
                break;
            case DT_HDD :
                SrcDC.SelectObject(&m_bmHardDrive);
                dc.BitBlt(4, 4, 23, 14, &SrcDC, 0, 0, SRCCOPY);
                sDeviceType.LoadString(IDS_DEVTYPEHDD);
                break;
            case DT_CDROM :
                SrcDC.SelectObject(&m_bmCDRom);
                dc.BitBlt(4, 4, 23, 14, &SrcDC, 0, 0, SRCCOPY);
                sDeviceType.LoadString(IDS_DEVTYPECDROM);
                break;
            case DT_AVATAR :
                SrcDC.SelectObject(&m_bmNone);
                dc.BitBlt(4, 4, 23, 14, &SrcDC, 0, 0, SRCCOPY);
                sDeviceType.LoadString(IDS_DEVTYPEAVATAR);
                break;
            case DT_PHONE :
            case DT_MO :
            case DT_NONE :
                SrcDC.SelectObject(&m_bmNone);
                dc.BitBlt(4, 4, 23, 14, &SrcDC, 0, 0, SRCCOPY);
                sDeviceType.LoadString(IDS_DEVTYPENONE);
                break;
        }

//      Print Text
        //

//      Select Font & Get Metrics
        CFont * pfontOld = (CFont *)dc.SelectObject(&m_fontMain);
        TEXTMETRIC tm;
        dc.GetTextMetrics(&tm);
        int nVMI = tm.tmHeight + tm.tmExternalLeading;
        dc.SetBkMode(TRANSPARENT);

CString sDevTypeTitle;
        sDevTypeTitle.LoadString(IDS_DEVICETYPE);
        CString sInstruct1;        sInstruct1.LoadString(IDS_INSTRUCT1);
        CString sInstruct2;        sInstruct2.LoadString(IDS_INSTRUCT2);

//      Output Text
        dc.TextOut(44, 2, sDevTypeTitle);
        dc.TextOut(44, 2 + nVMI, sDeviceType);
```

```
        dc.TextOut(15, 50, sInstruct1);
        dc.TextOut(15, 50 + nVMI, sInstruct2);

dc.SelectObject(pfontOld);
} void CMainWnd::OnDestroy()
{
        //      Remove Icon for System Tray
        NOTIFYICONDATA tnd;

tnd.cbSize = sizeof(NOTIFYICONDATA);
        tnd.hWnd   = m_hWnd;
        tnd.uID    = 1;
        tnd.uFlags = NIF_ICON;
        tnd.uCallbackMessage = ID_TRAYMSG;

Shell_NotifyIcon(NIM_DELETE, &tnd);

CWnd::OnDestroy();
} void CMainWnd::OnClose()
{
        //      If we are Visible, just hide until the TrayIcon
        //      is DoubleClicked again.
        if (IsWindowVisible())
        {
                ShowWindow(SW_HIDE);
                return;    //   Returning will cause us NOT to Close App
                           //   When we are Emulating it is convient to
                           //   Allow the App To Close
        }

//      Window is not visable, so we are being told to
        //      close by the system.
        CWnd::OnClose();
} void CMainWnd::OnDone()
{
        ShowWindow(SW_HIDE);
}
```

```
void CMainWnd::OnHelp()
{
        AfxMessageBox("Help Not Done Yet");
} void CMainWnd::OnRemove()
{

//      Tell BIOS to request Removal of Device
if (MB_RequestRemoval() != ERROR_SUCCESS)
{
        AfxMessageBox(IDS_NOBIOSSUPPORT);
        return;
}

//      Display Removing Driver Dialog Box
//              While this dialog box is present, we are waiting for the
//              OS to tell us if is ok to remove the device.
CRemovingDriver dlgRemovingDriver;

int nStatus = dlgRemovingDriver.DoModal();
switch (nStatus)
{
case RS_OK :
        {
                //      The OS Has Removed Driver so tell User it is
                //      OK to remove the Device now
                m_bRemoveOK = TRUE;
                CRemoveMedia dlgRemoveMedia;
                dlgRemoveMedia.DoModal();
                m_bRemoveOK = FALSE;
                break;
        }
case RS_OSABORT :
        AfxMessageBox(IDS_OSABORT);
        break;
case RS_BIOSABORT :
        AfxMessageBox(IDS_BIOSABORT);
        break;
case RS_OPERABORT :
        AfxMessageBox("It should not be possible to abort this
operation");
        break;
```

```
                default :
                        break;
                }
        }

LONG CMainWnd::OnDeviceChange(UINT nEventType, LONG dwData)
{

//      Get Current Device Type -- If Not Changed since last time
        //      silently return
        MB_DeviceType CurDeviceType = MB_GetDeviceType();
        if (CurDeviceType == m_wLastMediaType)
                return TRUE;

//      Update Our Pictures
        Invalidate();
        UpdateWindow();

//      Warn User if he is removing the device without
        //      letting us coordinate it.
        if (!m_bRemoveOK)
        {
                switch (nEventType)
                {
                case DBT_DEVICEARRIVAL :
//                      if (m_wLastMediaType != DT_NONE)
//                      {
//                              //      Warn User Not To change Media
//                              CSMIDlg dlgSMI;
//                              dlgSMI.DoModal();
//                      }
                        break;
                case DBT_DEVICEREMOVECOMPLETE :
                        if (m_wLastMediaType != CurDeviceType)
                        {
                                //      Warn User Not To change Media
                                CSMIDlg dlgSMI;
                                dlgSMI.DoModal();
                        }
                        break;
                }
        }
```

TI-22954 Page 37

```
              m_wLastMediaType = CurDeviceType;

return TRUE;
      }
  5
      void CMainWnd::OnSysCommand(UINT nID, LPARAM lParam)
      {
          switch (nID & 0xFFF0)
          {
 10           case IDM_ABOUT :
                  {
                      CAboutDlg dlgAbout;
                      dlgAbout.DoModal();
                      break;
 15               }
              default :
                      CWnd::OnSysCommand(nID, lParam);
                      break;
          }
 20   }
```

```
****************************************************************
*  MainWnd.h                                                    *
****************************************************************
   // MainWnd.h : header file
5  //

//////////////////////////////////////////////////////////////
   // CMainWnd window 10 class CMainWnd : public CWnd
   {
   // Construction
   public:
           BOOL m_bRemoveOK;
15         CMainWnd();

// Attributes
   public:
   protected:
20         CFont m_fontMain;
           MB_DeviceType m_wLastMediaType;
           CBitmap m_bmFloppy;
           CBitmap m_bmCDRom;
           CBitmap m_bmHardDrive;
25         CBitmap m_bmNone;
           CButton m_cntlRemove;
           CButton m_cntlHelp;
           CButton m_cntlDone;

30 // Operations
   public:

// Overrides
           // ClassWizard generated virtual function overrides
35         //{{AFX_VIRTUAL(CMainWnd)
           //}}AFX_VIRTUAL // Implementation
   public:
40         virtual ~CMainWnd();

// Generated message map functions
   protected:
           afx_msg LONG OnDeviceChange(UINT nEventType, LONG dwData);
```

TI-22954   Page 39

```
        afx_msg LONG OnTrayMsg(UINT wParam, LONG lParam);
        afx_msg void OnDone();
        afx_msg void OnHelp();
        afx_msg void OnRemove();

//{{AFX_MSG(CMainWnd)
        afx_msg void OnPaint();
        afx_msg void OnDestroy();
        afx_msg void OnClose();
        afx_msg int OnCreate(LPCREATESTRUCT lpCreateStruct);
        afx_msg void OnSysCommand(UINT nID, LPARAM lParam);
        //}}AFX_MSG
        DECLARE_MESSAGE_MAP()
    };
///////////////////////////////////////////////////////////
```

```
***********************************************************************
*  MBMon.clw                                                           *
***********************************************************************
; CLW file contains information for the MFC ClassWizard

[General Info]
Version=1
LastClass=CAboutDlg
LastTemplate=CDialog
NewFileInclude1=#include "stdafx.h"
NewFileInclude2=#include "MBMon.h"

ClassCount=8
Class1=CMBMonApp
Class2=CMBMonDlg
Class3=CAboutDlg

ResourceCount=5
Resource1=IDD_REMOVINGDRIVER
Resource2=IDR_MAINFRAME
Class4=CMainWnd
Class5=CTEST
Class6=CSMIDlg
Resource3=IDD_SMI
Resource4=IDD_ABOUTBOX
Class7=CRemoveMedia
Class8=CRemovingDriver
Resource5=IDD_REMOVEMEDIA

[CLS:CMBMonApp]
Type=0
HeaderFile=MBMon.h
ImplementationFile=MBMon.cpp
Filter=N
BaseClass=CWinApp
VirtualFilter=AC
LastObject=CMBMonApp

[CLS:CMBMonDlg]
Type=0
HeaderFile=MBMonDlg.h
ImplementationFile=MBMonDlg.cpp
Filter=D
LastObject=CMBMonDlg
```

TI-22954   Page 41

```
    [CLS:CAboutDlg]
    Type=0
    HeaderFile=MBMonDlg.h
5   ImplementationFile=MBMonDlg.cpp
    Filter=D
    LastObject=CAboutDlg

[DLG:IDD_ABOUTBOX]
10  Type=1
    Class=CAboutDlg
    ControlCount=4
    Control1=IDC_STATIC,static,1342177283
    Control2=IDC_STATIC,static,1342308481
15  Control3=IDC_STATIC,static,1342308353
    Control4=IDOK,button,1342373889

[CLS:CMainWnd]
    Type=0
20  HeaderFile=MainWnd.h
    ImplementationFile=MainWnd.cpp
    BaseClass=CWnd
    Filter=W
    VirtualFilter=WC
25  LastObject=CMainWnd

[CLS:CTEST]
    Type=0
    HeaderFile=TEST.h
30  ImplementationFile=TEST.cpp
    BaseClass=CWnd
    Filter=W
    VirtualFilter=WC
    LastObject=CTEST
35
    [DLG:IDD_SMI]
    Type=1
    Class=CSMIDlg
    ControlCount=4
40  Control1=IDC_STATIC,static,1342308352
    Control2=IDOK,button,1342242816
    Control3=IDC_STATIC,static,1342177283
    Control4=IDC_STATIC,static,1342308352
```

TI-22954 Page 42

```
   [CLS:CSMIDlg]
   Type=0
   HeaderFile=SMIDlg.h
   ImplementationFile=SMIDlg.cpp
5  BaseClass=CDialog
   Filter=D
   VirtualFilter=dWC
   LastObject=CSMIDlg 10 [DLG:IDD_REMOVEMEDIA]
   Type=1
   Class=CRemoveMedia
   ControlCount=1
   Control1=IDC_STATIC,static,1342308352
15
   [CLS:CRemoveMedia]
   Type=0
   HeaderFile=RemoveMedia.h
   ImplementationFile=RemoveMedia.cpp
20 BaseClass=CDialog
   Filter=D
   VirtualFilter=dWC
   LastObject=CRemoveMedia 25 [DLG:IDD_REMOVINGDRIVER]
   Type=1
   Class=CRemovingDriver
   ControlCount=1
   Control1=IDC_STATIC,static,1342308352
30
   [CLS:CRemovingDriver]
   Type=0
   HeaderFile=RemovingDriver.h
   ImplementationFile=RemovingDriver.cpp
35 BaseClass=CDialog
   Filter=D
   VirtualFilter=dWC
   LastObject=CRemovingDriver
```

```
***********************************************************************
* MBMon.cpp                                                            *
***********************************************************************
// MBMon.cpp : Defines the class behaviors for the application.
//
include "stdafx.h"
include "MBMon.h"
#include "MainWnd.h"

#ifdef _DEBUG
define new DEBUG_NEW
#undef THIS_FILE
static char THIS_FILE[] = __FILE__;
endif /////////////////////////////////////////////////////////////////////////////
// CMBMonApp BEGIN_MESSAGE_MAP(CMBMonApp, CWinApp)
        //{{AFX_MSG_MAP(CMBMonApp)
                // NOTE - the ClassWizard will add and remove mapping macros here.
                //   DO NOT EDIT what you see in these blocks of generated code!
        //}}AFX_MSG
        ON_COMMAND(ID_HELP, CWinApp::OnHelp)
END_MESSAGE_MAP()

/////////////////////////////////////////////////////////////////////////////
// CMBMonApp construction CMBMonApp::CMBMonApp()
{
}

/////////////////////////////////////////////////////////////////////////////
// The one and only CMBMonApp object CMBMonApp theApp;

/////////////////////////////////////////////////////////////////////////////
// CMBMonApp initialization BOOL CMBMonApp::InitInstance()
```

```
        {
        #ifdef _AFXDLL
                Enable3dControls();              // Call this when using MFC in
 5      a shared DLL
        #else
                Enable3dControlsStatic();        // Call this when linking to MFC
        statically
        #endif
10
                //      Create Our Main Window
                m_pMainWnd = new CMainWnd();

CString sClassName =
15      AfxRegisterWndClass(0,0,(HBRUSH)GetStockObject(LTGRAY_BRUSH));
                CString sAppName;  sAppName.LoadString(IDS_APPNAME);

m_pMainWnd->CreateEx(0, sClassName, sAppName,
                        WS_OVERLAPPED | WS_CAPTION | WS_SYSMENU |
20      WS_MINIMIZEBOX,
                        CW_USEDEFAULT, CW_USEDEFAULT, 318, 155,
        NULL, 0, NULL);

//      If we are launched Minimized, Hide our window
25              //      as we want only the icon on the Tray to appear
                m_pMainWnd->ShowWindow((m_nCmdShow == SW_MINIMIZE) ?
        SW_HIDE : m_nCmdShow);
                m_pMainWnd->UpdateWindow();

30              //      Create Icon on System Tray
                NOTIFYICONDATA tnd;

tnd.cbSize = sizeof(NOTIFYICONDATA);
                tnd.hWnd   = m_pMainWnd->m_hWnd;
35              tnd.uID    = 1;
                tnd.uFlags = NIF_MESSAGE | NIF_ICON | NIF_TIP;
                tnd.uCallbackMessage = ID_TRAYMSG;
                tnd.hIcon = LoadIcon(IDR_MAINFRAME);
                strcpy(tnd.szTip, sAppName);
40
                Shell_NotifyIcon(NIM_ADD, &tnd);

//      Register Window Handle with TISystem When Emulating
                #ifdef EMULATE_HARDWARE
```

```
            MB_RegisterMonitorWindow(m_pMainWnd->m_hWnd);
endif return TRUE;
5   }
```

```
***********************************************************************
*   MBMon.h                                                            *
***********************************************************************
//MBMon.h : main header file for the MBMON application
// ifndef __AFXWIN_H__
    #error include 'stdafx.h' before including this file for PCH
endif include "resource.h"    //    main symbols
include "tisys.h"       //    TI System Header File //      User Defined MESSAGES
define ID_TRAYMSG          WM_USER+1

/////////////////////////////////////////////////////////////////////////
// CMBMonApp:
// See MBMon.cpp for the implementation of this class
// class CMBMonApp : public CWinApp
{
public:
        CMBMonApp();

// Overrides
        // ClassWizard generated virtual function overrides
        //{{AFX_VIRTUAL(CMBMonApp)
        public:
        virtual BOOL InitInstance();
        //}}AFX_VIRTUAL // Implementation
        //{{AFX_MSG(CMBMonApp)
            // NOTE - the ClassWizard will add and remove member functions here.
            //    DO NOT EDIT what you see in these blocks of generated code !
        //}}AFX_MSG
        DECLARE_MESSAGE_MAP()
};
```

TI-22954 Page 47

```
*********************************************************************
*MBMon.rc                                                            *
*********************************************************************
//Microsoft™ Developer Studio generated resource script.
//
#include "resource.h"

#define APSTUDIO_READONLY_SYMBOLS
/////////////////////////////////////////////////////////////////////
//
// Generated from the TEXTINCLUDE 2 resource.
//
#include "afxres.h"

/////////////////////////////////////////////////////////////////////
undef APSTUDIO_READONLY_SYMBOLS /////////////////////////////////////////////////////////////////////
// English (U.S.) resources if !defined(AFX_RESOURCE_DLL) || defined(AFX_TARG_ENU)
ifdef _WIN32
LANGUAGE LANG_ENGLISH, SUBLANG_ENGLISH_US
#pragma code_page(1252)
endif //_WIN32 ifdef APSTUDIO_INVOKED
/////////////////////////////////////////////////////////////////////
//
// TEXTINCLUDE
//

1 TEXTINCLUDE DISCARDABLE
BEGIN
   "resource.h\0"
END

2 TEXTINCLUDE DISCARDABLE
BEGIN
   "#include ""afxres.h""\r\n"
   "\0"
END

3 TEXTINCLUDE DISCARDABLE
```

```
BEGIN
    "#define _AFX_NO_SPLITTER_RESOURCES\r\n"
    "#define _AFX_NO_OLE_RESOURCES\r\n"
    "#define _AFX_NO_TRACKER_RESOURCES\r\n"
    "#define _AFX_NO_PROPERTY_RESOURCES\r\n"
    "\r\n"
    "#if !defined(AFX_RESOURCE_DLL) || defined(AFX_TARG_ENU)\r\n"
    "#ifdef _WIN32\r\n"
    "LANGUAGE 9, 1\r\n"
    "#pragma code_page(1252)\r\n"
    "#endif\r\n"
    "#include ""res\\MBMon.rc2""  // non-Microsoft™ Visual C++ edited resources\r\n"
    "#include ""afxres.rc""    // Standard components\r\n"
    "#endif\0"
END endif    // APSTUDIO_INVOKED

/////////////////////////////////////////////////////////////////////////////
//
// Icon
//

// Icon with lowest ID value placed first to ensure application icon
// remains consistent on all systems.
IDR_MAINFRAME           ICON    DISCARDABLE     "res\\MBMon.ico"

/////////////////////////////////////////////////////////////////////////////
//
// Dialog
//

IDD_ABOUTBOX DIALOG DISCARDABLE  0, 0, 207, 55
STYLE DS_MODALFRAME | WS_POPUP | WS_CAPTION | WS_SYSMENU
CAPTION "About MBMon"
FONT 8, "MS Sans Serif"
BEGIN
    ICON            IDR_MAINFRAME,IDC_STATIC,5,5,21,20
    CTEXT           "MBMon Version 1.0.1",IDC_STATIC,40,10,119,8,SS_NOPREFIX
    CTEXT           "Copyright © 1996\nTexas Instruments Incorporated",
```

```
                IDC_STATIC,40,25,119,23
        DEFPUSHBUTTON  "OK",IDOK,170,5,32,14,WS_GROUP
        END

5     IDD_SMI DIALOG DISCARDABLE  0, 0, 172, 90
        STYLE DS_MODALFRAME | WS_POPUP | WS_CAPTION |
        WS_SYSMENU
        CAPTION "Unexpected Media Device Removal"
        FONT 8, "MS Sans Serif"
 10     BEGIN
            LTEXT       "You should use the Media Bay Icon on the taskbar to
        remove Media Devices.",
                IDC_STATIC,40,7,124,22
            PUSHBUTTON    "OK",IDOK,115,70,50,14
 15         ICON        IDR_MAINFRAME,IDC_STATIC,5,5,18,20
            LTEXT       "Removing devices without warning the system can cause
        unexpected problems and possible loss of data.",
                IDC_STATIC,7,34,158,31
        END
 20
        IDD_REMOVEMEDIA DIALOG DISCARDABLE  0, 0, 160, 60
        STYLE DS_MODALFRAME | WS_POPUP | WS_CAPTION |
        WS_SYSMENU
        CAPTION "Remove Media Device"
 25     FONT 8, "MS Sans Serif"
        BEGIN
            LTEXT       "You can now safely remove the Media Device from the
        Media Bay.",
                IDC_STATIC,7,7,146,25
 30     END IDD_REMOVINGDRIVER DIALOG DISCARDABLE  0, 0, 186, 58
        STYLE DS_MODALFRAME | WS_POPUP | WS_CAPTION
        CAPTION "Removing Device Driver"
 35     FONT 8, "MS Sans Serif"
        BEGIN
            LTEXT       "Please wait while the Operating System removes the driver
        for the device in the Media Bay.",
                IDC_STATIC,7,7,172,30
 40     END ifndef _MAC
        //////////////////////////////////////////////////////////////
```

```
      //
      // Version
      //

5    VS_VERSION_INFO VERSIONINFO
       FILEVERSION 1,0,0,1
       PRODUCTVERSION 1,0,0,1
       FILEFLAGSMASK 0x3fL
       #ifdef _DEBUG
10     FILEFLAGS 0x1L
       #else
       FILEFLAGS 0x0L
       #endif
       FILEOS 0x4L
15     FILETYPE 0x1L
       FILESUBTYPE 0x0L
       BEGIN
         BLOCK "StringFileInfo"
         BEGIN
20         BLOCK "040904b0"
           BEGIN
             VALUE "CompanyName", "Texas Instruments Incorporated\0"
             VALUE "FileDescription", "MBMON MFC Application\0"
             VALUE "FileVersion", "1, 0, 0, 1\0"
25           VALUE "InternalName", "MBMON\0"
             VALUE "LegalCopyright", "Copyright © 1996 Texas Instruments
       Incorporated\0"
             VALUE "OriginalFilename", "MBMON.EXE\0"
             VALUE "ProductName", "MBMON Application\0"
30           VALUE "ProductVersion", "1, 0, 0, 1\0"
           END
         END
         BLOCK "VarFileInfo"
         BEGIN
35         VALUE "Translation", 0x409, 1200
         END
       END endif   // !_MAC
40

/////////////////////////////////////////////////////////////////////
       //
       // DESIGNINFO
```

TI-22954   Page 52

```
//
ifdef APSTUDIO_INVOKED
GUIDELINES DESIGNINFO DISCARDABLE
BEGIN
    IDD_ABOUTBOX, DIALOG
    BEGIN
       LEFTMARGIN, 7
       RIGHTMARGIN, 200
       TOPMARGIN, 7
       BOTTOMMARGIN, 48
    END IDD_SMI, DIALOG
    BEGIN
       LEFTMARGIN, 7
       RIGHTMARGIN, 165
       TOPMARGIN, 7
       BOTTOMMARGIN, 83
    END IDD_REMOVEMEDIA, DIALOG
    BEGIN
       LEFTMARGIN, 7
       RIGHTMARGIN, 153
       TOPMARGIN, 7
       BOTTOMMARGIN, 53
    END IDD_REMOVINGDRIVER, DIALOG
    BEGIN
       LEFTMARGIN, 7
       RIGHTMARGIN, 179
       TOPMARGIN, 7
       BOTTOMMARGIN, 51
    END
END
endif   // APSTUDIO_INVOKED /////////////////////////////////////////////////////////////
//
// Bitmap
//
```

```
        IDB_CDROM        BITMAP DISCARDABLE    "res\\cdrom.bmp"
        IDB_FLOPPY       BITMAP DISCARDABLE    "res\\floppy.bmp"
        IDB_HARDDRIVE    BITMAP DISCARDABLE    "res\\harddriv.bmp"

/////////////////////////////////////////////////////////////////////////
//
// String Table
//

STRINGTABLE DISCARDABLE
BEGIN
    IDS_ABOUTBOX        "&About MBMon..."
    IDS_OKBUTTON        "&Ok"
    IDS_HELPBUTTON      "&Help"
    IDS_REMOVEBUTTON    "&Remove"
    IDS_APPNAME         "Media Bay Monitor"
    IDS_OSABORT         "System Aborted Removing Device\n\nClose all applications that are\n using the device and try again"
    IDS_BIOSABORT       "The current device in the Media Bay is the boot device. You cannot remove it."
    IDS_MENUABOUT       "&About ..."
    IDS_NOBIOSSUPPORT   "BIOS does not support removing the Media Bay Device."
    IDS_DEVICETYPE      "Device Type:"
    IDS_INSTRUCT1       "Before removing the device from"
END STRINGTABLE DISCARDABLE
BEGIN
    IDS_INSTRUCT2       "the Media Bay, click Remove."
    IDS_DEVTYPEFLOPPY   "Floppy Drive"
    IDS_DEVTYPEHDD      "Hard Disk Drive"
    IDS_DEVTYPECDROM    "CD Rom"
    IDS_DEVTYPENONE     "None"
    IDS_DEVTYPEAVATAR   "Removable Media"
END endif    // English (U.S.) resources
///////////////////////////////////////////////////////////////////////// ifndef APSTUDIO_INVOKED
```

```
/////////////////////////////////////////////////////////////////////////
//
// Generated from the TEXTINCLUDE 3 resource.
//
#define _AFX_NO_SPLITTER_RESOURCES
#define _AFX_NO_OLE_RESOURCES
#define _AFX_NO_TRACKER_RESOURCES
define _AFX_NO_PROPERTY_RESOURCES if !defined(AFX_RESOURCE_DLL) || defined(AFX_TARG_ENU)
ifdef _WIN32
LANGUAGE 9, 1
#pragma code_page(1252)
#endif
#include "res\MBMon.rc2"  // non-Microsoft™ Visual C++ edited resources
#include "afxres.rc"       // Standard components
#endif
/////////////////////////////////////////////////////////////////////////
#endif    // not APSTUDIO_INVOKED
```

```
//***********************************************************************
* MBMon.rc2                                                              *
//***********************************************************************
//
// MBMON.RC2 - resources Microsoft™ Visual C++ does not edit directly
// ifdef APSTUDIO_INVOKED
    #error this file is not editable by Microsoft™ Visual C++
endif //APSTUDIO_INVOKED /////////////////////////////////////////////////////////////
// Add manually edited resources here...

/////////////////////////////////////////////////////////////
```

```
***************************************************************
*   RemoveMedia.cpp                                            *
***************************************************************
// RemoveMedia.cpp : implementation file
// include "stdafx.h"
include "MBMon.h"
#include "RemoveMedia.h"

#ifdef _DEBUG
define new DEBUG_NEW
#undef THIS_FILE
static char THIS_FILE[] = __FILE__;
endif /////////////////////////////////////////////////////////////////////////////
// CRemoveMedia dialog CRemoveMedia::CRemoveMedia(CWnd* pParent /*=NULL*/)
    : CDialog(CRemoveMedia::IDD, pParent)
{
    //{{AFX_DATA_INIT(CRemoveMedia)
        // NOTE: the ClassWizard will add member initialization here
    //}}AFX_DATA_INIT
} void CRemoveMedia::DoDataExchange(CDataExchange* pDX)
{
    CDialog::DoDataExchange(pDX);
    //{{AFX_DATA_MAP(CRemoveMedia)
        // NOTE: the ClassWizard will add DDX and DDV calls here
    //}}AFX_DATA_MAP
}

BEGIN_MESSAGE_MAP(CRemoveMedia, CDialog)
    //{{AFX_MSG_MAP(CRemoveMedia)
    ON_WM_TIMER()
    //}}AFX_MSG_MAP
END_MESSAGE_MAP()
```

TI-22954 Page 57

```
//////////////////////////////////////////////////////////////
// CRemoveMedia message handlers void CRemoveMedia::OnTimer(UINT nIDEvent)
5   {
        if ((* MB_GetDeviceType)() != m_DeviceType)
        {
            EndDialog(IDOK);
            return;
10      }

CDialog::OnTimer(nIDEvent);
    }

15  BOOL CRemoveMedia::OnInitDialog()
    {
        CDialog::OnInitDialog();

m_DeviceType = (* MB_GetDeviceType)();
20
        //      Start The Timer
        SetTimer(1, 250, NULL);

return TRUE;
25  }
```

```
***********************************************************************
* RemoveMedia.h                                                        *
***********************************************************************
// RemoveMedia.h : header file
//

/////////////////////////////////////////////////////////////////////////
// CRemoveMedia dialog class CRemoveMedia : public CDialog
{
// Construction
public:
        MB_DeviceType m_DeviceType;
        CRemoveMedia(CWnd* pParent = NULL);   // standard constructor // Dialog Data
        //{{AFX_DATA(CRemoveMedia)
        enum { IDD = IDD_REMOVEMEDIA };
                // NOTE: the ClassWizard will add data members here
        //}}AFX_DATA // Overrides
        // ClassWizard generated virtual function overrides
        //{{AFX_VIRTUAL(CRemoveMedia)
        protected:
        virtual void DoDataExchange(CDataExchange* pDX);    // DDX/DDV support
        //}}AFX_VIRTUAL // Implementation
protected:

// Generated message map functions
        //{{AFX_MSG(CRemoveMedia)
        afx_msg void OnTimer(UINT nIDEvent);
        virtual BOOL OnInitDialog();
        //}}AFX_MSG
        DECLARE_MESSAGE_MAP()
};
```

```
*************************************************************************
* RemovingDriver.cpp                                                     *
*************************************************************************
// RemovingDriver.cpp : implementation file
// include "stdafx.h"
include "MBMon.h"
#include "RemovingDriver.h"

#ifdef _DEBUG
define new DEBUG_NEW
#undef THIS_FILE
static char THIS_FILE[] = __FILE__;
endif /////////////////////////////////////////////////////////////////////////
// CRemovingDriver dialog CRemovingDriver::CRemovingDriver(CWnd* pParent /*=NULL*/)
    : CDialog(CRemovingDriver::IDD, pParent)
{
    //{{AFX_DATA_INIT(CRemovingDriver)
        // NOTE: the ClassWizard will add member initialization here
    //}}AFX_DATA_INIT
} void CRemovingDriver::DoDataExchange(CDataExchange* pDX)
{
    CDialog::DoDataExchange(pDX);
    //{{AFX_DATA_MAP(CRemovingDriver)
        // NOTE: the ClassWizard will add DDX and DDV calls here
    //}}AFX_DATA_MAP
}

BEGIN_MESSAGE_MAP(CRemovingDriver, CDialog)
    //{{AFX_MSG_MAP(CRemovingDriver)
    ON_WM_TIMER()
    //}}AFX_MSG_MAP
END_MESSAGE_MAP()
```

TI-22954 Page 60

```
//////////////////////////////////////////////////////
// CRemovingDriver message handlers BOOL CRemovingDriver::OnInitDialog()
5   {
        CDialog::OnInitDialog();

CenterWindow();

10      SetTimer(1, 250, NULL);

return TRUE;
    }

15
    void CRemovingDriver::OnTimer(UINT nIDEvent)
    {
        //      Check Remove Status
        switch ((* MB_GetRemovalStatus)())
20      {
        case RS_OK :
                EndDialog(RS_OK);
                break;
        case RS_OSABORT :
25              EndDialog(RS_OSABORT);
                break;
        case RS_BIOSABORT :
                EndDialog(RS_BIOSABORT);
                break;
30      case RS_WAITING :
                break;
        }

CDialog::OnTimer(nIDEvent);
35  } void CRemovingDriver::OnCancel()
    {
        //      Impossible to Cancel this Operation!
40  //      EndDialog(RS_OPERABORT);
    }
```

```
    void CRemovingDriver::OnOK()
    {
        //      Impossible to OK this Operation!
    //      EndDialog(RS_OPERABORT);
5   }
```

```
*********************************************************************
* RemovingDriver.h                                                   *
*********************************************************************
// RemovingDriver.h : header file
//

/////////////////////////////////////////////////////////////////////
// CRemovingDriver dialog class CRemovingDriver : public CDialog
{
// Construction
public:
        CRemovingDriver(CWnd* pParent = NULL);   // standard constructor // Dialog Data
        //{{AFX_DATA(CRemovingDriver)
        enum { IDD = IDD_REMOVINGDRIVER };
                // NOTE: the ClassWizard will add data members here
        //}}AFX_DATA // Overrides
        // ClassWizard generated virtual function overrides
        //{{AFX_VIRTUAL(CRemovingDriver)
        protected:
        virtual void DoDataExchange(CDataExchange* pDX);    // DDX/DDV support
        //}}AFX_VIRTUAL // Implementation
protected:
        virtual void OnOK();
        virtual void OnCancel();

// Generated message map functions
        //{{AFX_MSG(CRemovingDriver)
        virtual BOOL OnInitDialog();
        afx_msg void OnTimer(UINT nIDEvent);
        //}}AFX_MSG
        DECLARE_MESSAGE_MAP()
};
```

```
************************************************************************
*  resource.h                                                           *
************************************************************************
       //{{NO_DEPENDENCIES}}
 5     // Microsoft™ Developer Studio generated include file.
       // Used by MBMon.rc
       //
       #define IDM_ABOUTBOX            0x0010
       #define IDM_ABOUT               0x10
10     #define IDD_ABOUTBOX            100
       #define IDS_ABOUTBOX            101
       #define IDD_MBMON_DIALOG        102
       #define IDS_OKBUTTON            102
       #define IDS_HELPBUTTON          103
15     #define IDS_REMOVEBUTTON        104
       #define IDS_APPNAME             105
       #define IDS_OSABORT             106
       #define IDS_BIOSABORT           107
       #define IDS_MENUABOUT           108
20     #define IDS_NOBIOSSUPPORT       109
       #define IDS_DEVICETYPE          110
       #define IDS_INSTRUCT1           111
       #define IDS_INSTRUCT2           112
       #define IDS_DEVTYPEFLOPPY       113
25     #define IDS_DEVTYPEHDD          114
       #define IDS_DEVTYPECDROM        115
       #define IDS_DEVTYPENONE         116
       #define IDS_DEVTYPEAVATAR       117
       #define IDR_MAINFRAME           128
30     #define IDB_CDROM               129
       #define IDB_FLOPPY              130
       #define IDB_HARDDRIVE           131
       #define IDD_SMI                 132
       #define IDD_REMOVEMEDIA         133
35     #define IDD_REMOVINGDRIVER      134
       #define IDB_NONE                136

// Next default values for new objects
       //
40     #ifdef APSTUDIO_INVOKED
       #ifndef APSTUDIO_READONLY_SYMBOLS
       #define _APS_NEXT_RESOURCE_VALUE    137
       #define _APS_NEXT_COMMAND_VALUE     32771
       #define _APS_NEXT_CONTROL_VALUE     1003
```

```
#define _APS_NEXT_SYMED_VALUE      102
#endif
#endif
```

```
***********************************************************************
*  SMIDlg.cpp                                                          *
***********************************************************************
//SMIDlg.cpp : implementation file
// include "stdafx.h"
include "MBMon.h"
#include "SMIDlg.h"

#ifdef _DEBUG
define new DEBUG_NEW
#undef THIS_FILE
static char THIS_FILE[] = __FILE__;
endif /////////////////////////////////////////////////////////////////////////
// CSMIDlg dialog CSMIDlg::CSMIDlg(CWnd* pParent /*=NULL*/)
        : CDialog(CSMIDlg::IDD, pParent)
{
        //{{AFX_DATA_INIT(CSMIDlg)
                // NOTE: the ClassWizard will add member initialization here
        //}}AFX_DATA_INIT
} void CSMIDlg::DoDataExchange(CDataExchange* pDX)
{
        CDialog::DoDataExchange(pDX);
        //{{AFX_DATA_MAP(CSMIDlg)
                // NOTE: the ClassWizard will add DDX and DDV calls here
        //}}AFX_DATA_MAP
}

BEGIN_MESSAGE_MAP(CSMIDlg, CDialog)
        //{{AFX_MSG_MAP(CSMIDlg)
        //}}AFX_MSG_MAP
END_MESSAGE_MAP()

/////////////////////////////////////////////////////////////////////
```

TI-22954   Page 66

```
        // CSMIDlg message handlers

BOOL CSMIDlg::OnInitDialog()
        {
 5          CDialog::OnInitDialog();

CenterWindow();
            ShowWindow(SW_SHOWNORMAL);
            SetForegroundWindow();
10
            return TRUE;
        }
```

```
***********************************************************************
*  SMIDlg.h                                                            *
***********************************************************************
// SMIDlg.h : header file
//

/////////////////////////////////////////////////////////////////
// CSMIDlg dialog class CSMIDlg : public CDialog
{
// Construction
public:
        CSMIDlg(CWnd* pParent = NULL);   // standard constructor // Dialog Data
        //{{AFX_DATA(CSMIDlg)
        enum { IDD = IDD_SMI };
                // NOTE: the ClassWizard will add data members here
        //}}AFX_DATA // Overrides
        // ClassWizard generated virtual function overrides
        //{{AFX_VIRTUAL(CSMIDlg)
        protected:
        virtual void DoDataExchange(CDataExchange* pDX);    // DDX/DDV support
        //}}AFX_VIRTUAL // Implementation
protected:

// Generated message map functions
        //{{AFX_MSG(CSMIDlg)
        virtual BOOL OnInitDialog();
        //}}AFX_MSG
        DECLARE_MESSAGE_MAP()
};
```

TI-22954   Page 68

```
**********************************************************************
* stdafx.cpp                                                          *
**********************************************************************
// stdafx.cpp : source file that includes just the standard includes
//      MBMon.pch will be the pre-compiled header
//      stdafx.obj will contain the pre-compiled type information include "stdafx.h"
```

```
************************************************************************
* stdafx.h                                                              *
************************************************************************
// stdafx.h : include file for standard system include files,
// or project specific include files that are used frequently, but
//     are changed infrequently
// define VC_EXTRALEAN            // Exclude rarely-used stuff from Windows™ headers include <afxwin.h>      // MFC core and standard components
include <afxext.h>      // MFC extensions
#ifndef _AFX_NO_AFXCMN_SUPPORT
#include <afxcmn.h>              // MFC support for Windows™ Common Controls
#endif // _AFX_NO_AFXCMN_SUPPORT
```

```
/************************************************************************
*  stdtypes.h                                                           *
************************************************************************/
// from Windows.h /****** Simple types & common helper macros
********************************/ typedef int           BOOL;
      #define FALSE          0
      #define TRUE           1
      #define FAR           _far
      #define NEAR          _near typedef unsigned char   BYTE;
      typedef unsigned short  WORD;
      typedef unsigned long   DWORD;
      typedef unsigned int    UINT;
      typedef signed long     LONG;
      typedef BYTE NEAR*      PBYTE;
      typedef BYTE FAR*       LPBYTE;
      typedef WORD NEAR*      PWORD;
      typedef WORD FAR*       LPWORD;
      typedef const char FAR* LPCSTR;

#define LOBYTE(w)      ((BYTE)(w))
      #define HIBYTE(w)      ((BYTE)(((UINT)(w) >> 8) & 0xFF))

#define LOWORD(l)      ((WORD)(DWORD)(l))
      #define HIWORD(l)      ((WORD)((((DWORD)(l)) >> 16) & 0xFFFF))

#define MAKELONG(low, high) ((LONG)(((WORD)(low)) | \
      (((DWORD)((WORD)(high))) << 16)))

#ifndef NOMINMAX
      #ifndef max
      #define max(a,b)       (((a) > (b)) ? (a) : (b))
      #endif
      #ifndef min
      #define min(a,b)       (((a) < (b)) ? (a) : (b))
      #endif
      #endif /* NOMINMAX */
```

```
/****** Common pointer types
*************************************************/ ifndef NULL
5   #define NULL     0
    #endif
```

```
*************************************************************************
* TISys.h                                                                *
*************************************************************************
//      TISYS.H
//
//      Header File for All Applications Using TISYSTEM
//
#ifdef _WINDOWS
        #ifdef _WIN32
                #define _export
                #define DllExport __declspec(dllexport)
                #define DllImport __declspec(dllimport)
        #else
                #define DllImport WINAPI _export
                #define DllExport WINAPI _export
        #endif
#else // DOS
        #define DllImport
        #define DllExport
        #include "stdtypes.h"
endif //      Structure to define layout of
//      CMOS Usage Table Entries
//
#pragma warning (disable : 4200)
struct CMOS_USAGE_ENTRY
{
        BYTE nSize;
        BYTE nAddress;
        BYTE nBits;
        BYTE nBitPos;
        WORD nMaxValue;
        WORD nDefValue;
        char szPropName[0];                  //      Extension (4200)
};
#pragma warning (default : 4200)

//      Data Types
//
enum MB_DeviceType {  //      Defines type of Device in Media Bay
        DT_PHONE = 9,
        DT_MO    = 10,
        DT_AVATAR = 11,
```

```
            DT_HDD    = 12,
            DT_CDROM  = 13,
            DT_FLOPPY = 14,
            DT_NONE   = 15,
 5     };

enum MB_RemovalStatus {    //    Removal Status return by
       MB_GetRemovalStatus()
            RS_WAITING  = 0,      //    Initial
10          RS_OK       = 1,      //    OK to unplug
            RS_OSABORT  = 2,      //    OS Wants to abort operation
            RS_BIOSABORT = 4,     //    BIOS Wants to abort operation
            RS_OPERABORT = 100    //    Used only in debug situations
       };
15
       //////////////////////////////////////////////////////////
       //    TI Properties
       typedef struct t_TIProperty {
         union
20       {        .
           int           iVal;
                  LPCSTR     szVal;
         };
       } TIProperty, *pTIProperty;
25

//    CPUTYPE Enum Values
       //
       enum CPUTypes {
30          CPUTYPE_SX,
            CPUTYPE_DX,
            CPUTYPE_SXL,
            CPUTYPE_DX2,
            CPUTYPE_SLC,
35          CPUTYPE_ID_AVAIL
       };

//    CPUMODEL Enum Values
       //
40     enum CPUModels {
            CPUMODEL_386,
            CPUMODEL_486,
            CPUMODEL_PENTIUM
       };
```

TI-22954 Page 74

```
//      CPUSPEED Enum Values
//
enum CPUSpeeds {
        CPUSPEED_75,
        CPUSPEED_90,
        CPUSPEED_120,
        CPUSPEED_133,
        CPUSPEED_150,
        CPUSPEED_166,
        CPUSPEED_200
};

//      OEMMODELID Enum Values
//
enum OEMModelIDs {
        OEMMODELID_TI,
        OEMMODELID_GATEWAY,
        OEMMODELID_DATA_GENERAL,
        OEMMODELID_COMPUADD,
        OEMMODELID_SHARP,
        OEMMODELID_BLOOMBERG
};

//      LCDTYPE enum Values
//
enum LCDTypes {
        LCDTYPE_STD_MONO,
        LCDTYPE_PASSIVE_MATRIX,
        LCDTYPE_ACTIVE_MATRIX,
        LCDTYPE_EL,
        LCDTYPE_DUALSCAN_PASSIVE
};

//      VGAMANUF Enum Values
//
enum VGAManufs {
        VGAMANUF_WESTERNDIGITAL,
        VGAMANUF_CIRRUS
};

//      SYSTYPE Enum Values
//
enum SysTypes {
```

```
                SYSTYPE_RESERVED,
                SYSTYPE_LAPTOP,
                SYSTYPE_NOTEBOOK
        };

//      DOCK(A|B)TYPE Enum Values
        //
        enum DockTypes {
                DOCKTYPE_NONE,
                DOCKTYPE_DOCKMATE,
                DOCKTYPE_DOCKMATE_PLUS,
                DOCKTYPE_DOCKMATE_NET_READY,
                DOCKTYPE_DOCKMATE_MULTIMEDIA,
                DOCKTYPE_GENERAL_PNP
        };

enum SoundLevels {
                SOUNDLEVEL_AUTO,
                SOUNDLEVEL_LOW,
                SOUNDLEVEL_MEDIUM,
                SOUNDLEVEL_HIGH
        };

enum SerPorts {
                SERPORT_NONE,
                SERPORT_COM1,
                SERPORT_COM2,
                SERPORT_COM3,
                SERPORT_COM4
        };

enum ComAddresses {
                COMADDRESS_338_238,
                COMADDRESS_3E8_2E8,
                COMADDRESS_2E8_2E0,
                COMADDRESS_220_228
        };

enum LptAddresses {
                LPTADDRESS_DISABLED,
                LPTADDRESS_3BC,
                LPTADDRESS_378,
                LPTADDRESS_278
        };
```

TI-22954    Page 76

```
        enum LptModes {
              LPTMODE_STANDARD,
              LPTMODE_SPP,
 5            LPTMODE_EPPSPP,
              LPTMODE_ECP,
              LPTMODE_ECPEPP
        };

10      //    VIDEOBOARD Enum Values
        //
        enum VideoBoards {
              VIDEOBOARD_SIRRUS6420,
              VIDEOBOARD_SIRRUS6440,
15            VIDEOBOARD_SIRRUS754X
        };

enum Platforms {
              PLATFORM_LILY,
20            PLATFORM_ECLIPSE
        };

enum Models {
              MODEL_UNKNOWN,
25            MODEL_TM5000,
              MODEL_TM6000
        };

enum DfltCPUSpeeds {
30            DFLTCPUSPEED_AUTO,
              DFLTCPUSPEED_LOW,
              DFLTCPUSPEED_MEDIUM,
              DFLTCPUSPEED_HIGH
        };
35
        enum PowerSavings {
              POWERSAVING_AUTO,
              POWERSAVING_OFF,
              POWERSAVING_ON
40      };

enum SoundPortSetting {
              SOUNDPORTSETTING_OFF,
              SOUNDPORTSETTING_ON,
```

TI-22954   Page 77

```
              SOUNDPORTSETTING_AUTO
      };

enum TimeoutInts {
5            TIMEOUTINT_ALLWAYS,
             TIMEOUTINT_AFTER1MIN,
             TIMEOUTINT_AFTER2MIN,
             TIMEOUTINT_AFTER3MIN,
             TIMEOUTINT_AFTER5MIN,
10           TIMEOUTINT_AFTER10MIN,
             TIMEOUTINT_AFTER15MIN
      };

enum SysTimeoutActions {
15           SYSTIMEOUTACT_OFF,
             SYSTIMEOUTACT_SUSPEND,//    Default
             SYSTIMEOUTACT_STANDBY,
             SYSTIMEOUTACT_SAVE2DISK
      };
20
      enum StandbyTimeoutActions {
             STBYTIMEOUTACT_OFF,
             STBYTIMEOUTACT_SUSPEND,     //    Default
             STBYTIMEOUTACT_SAVE2DISK
25    };

enum DisplaySelections {
             DISPLAYSELECT_LCD,
             DISPLAYSELECT_CRT,
30           DISPLAYSELECT_BOTH,
             DISPLAYSELECT_TVOUT
      };

enum DisplayBrightnesses {
35           DISPLAYBRIGHTNESS_AUTO,
             DISPLAYBRIGHTNESS_HIGH,
             DISPLAYBRIGHTNESS_MEDIUM,
             DISPLAYBRIGHTNESS_LOW
      };
40
      enum LCDPalettes {
             LCDPALETTE_DISABLED,
             LCDPALETTE_TFT_PAL1,
             LCDPALETTE_TFT_PAL2,
```

TI-22954 Page 78

```
                LCDPALETTE_TFT_PAL3,
                LCDPALETTE_TFT_PAL4,
                LCDPALETTE_DSTN_PAL1,
                LCDPALETTE_DSTN_PAL2,
5               LCDPALETTE_DSTN_PAL3,
                LCDPALETTE_DSTN_PAL4
        };

enum EXTCPUCACHE {
10              EXTCPUCACHE_AUTO,
                EXTCPUCACHE_OFF,
                EXTCPUCACHE_ON
        };

15      enum PCMCIAIOAdds {
                PCMCIAIOADDS_MIN,
                PCMCIAIOADDS_MAX,
                PCMCIAIOADDS_DOCKED_PCMCIAPCI,
                PCMCIAIOADDS_DOCKED_PCI
20      };

/////////////////////////////////////////////////////////
25      // Public C interface
        //
        #ifdef __cplusplus
                #ifndef _WIN32
                        extern "C" {
30              #endif
        #endif // Media Bay Monitor API
        //
35      #ifdef _WINDOWS
                #ifndef MEDIABAY_CPP
                        MB_DeviceType DllImport MB_GetDeviceType();
                        BOOL DllImport MB_RequestRemoval();
                        MB_RemovalStatus DllImport MB_GetRemovalStatus();
40              #else
                        MB_DeviceType DllExport MB_GetDeviceType();
                        BOOL DllExport MB_RequestRemoval();
                        MB_RemovalStatus DllExport MB_GetRemovalStatus();
                #endif
```

TI-22954 Page 79

```
        #endif

//      System Properties API
 5      #ifdef _WINDOWS
            #ifndef SYSPROPS_CPP
                    void DllImport SP_DoSetupPropSheet();
                    void DllImport SP_DoSysInfoPropSheet();
            #else
10                  void DllExport SP_DoSetupPropSheet();
                    void DllExport SP_DoSysInfoPropSheet();
            #endif
        #endif 15
        //      Platform Support API
        //
        #ifdef _WINDOWS
            #ifndef PLATFORMSUP_CPP
20                  BOOL DllImport PS_SetTIProperty(const char* PropName,
        TIProperty* pProp);
                    BOOL DllImport PS_GetTIProperty(const char* PropName,
        TIProperty* pProp);
                    BOOL DllImport PS_GetTIPropertyDefault(const char*
25      PropName, TIProperty* pProp);
                    BOOL DllImport PS_SetTIPropertyDefault(const char*
        PropName);

typedef void (FAR PASCAL* LP_PSDOSETUPPROPSHEET)();
30                  typedef void (FAR PASCAL*
        LP_PSDOSYSINFOPROPSHEET)();
                    typedef BOOL (FAR PASCAL* LP_PSGETTIPROPERTY)(const
        char* PropName, TIProperty* pProp);
                    typedef BOOL (FAR PASCAL* LP_PSSETTIPROPERTY)(const
35      char* PropName, TIProperty* pProp);
                    typedef BOOL (FAR PASCAL*
        LP_PSGETTIPROPERTYDEFAULT)(const char* PropName, TIProperty*
        pProp);
                    typedef BOOL (FAR PASCAL*
40      LP_PSSETTIPROPERTYDEFAULT)(const char* PropName);
            #else
                    BOOL DllExport PS_SetTIProperty(const char* PropName,
        TIProperty* pProp);
```

```
                    BOOL DllExport PS_GetTIProperty(const char* PropName,
        TIProperty* pProp);
                    BOOL DllExport PS_GetTIPropertyDefault(const char*
        PropName, TIProperty* pProp);
  5                 BOOL DllExport PS_SetTIPropertyDefault(const char*
        PropName);
            #endif else  //    DOS Property Interface
 10         BOOL DllImport GetTIProperty(const char* PropName, TIProperty*
        pProp);
            BOOL DllImport SetTIProperty(const char* PropName, TIProperty*
        pProp);
            BOOL DllImport GetTIPropertyDefault(const char* szPropName,
 15     TIProperty* pProp);
            BOOL DllImport SetTIPropertyDefault(const char* szPropName);
        #endif 20     //    SYSTEM LEVEL API (Avoid use if possible)
        //
        #ifndef SYSLEVEL_CPP
            LPCSTR  DllImport SL_GetBiosVersion();
            BYTE    DllImport SL_CMosRead(WORD Address);
 25         BOOL    DllImport SL_CMosWrite(WORD Address, BYTE Value);
            BOOL    DllImport SL_ACPower();
            int     DllImport SL_GetBatteryLevel(int nBattery);
            DWORD   DllImport SL_GetBiosMemory(WORD wSegment, WORD
        wOffset, BYTE* pbBuffer, WORD wSize);
 30         DWORD   DllImport SL_MakeIntCall(WORD wInterrupt, union
        REGS* pInRegs, union REGS* pOutRegs);
            DWORD   DllImport SL_ReadPort(WORD wPort, BYTE* pbValue);
            DWORD   DllImport SL_WritePort(WORD wPort, BYTE bValue);
            Platforms DllImport SL_GetPlatform();
 35         Models    DllImport SL_GetModel();
        #else
            LPCSTR  DllExport SL_GetBiosVersion();
            BYTE    DllExport SL_CMosRead(WORD Address);
            BOOL    DllExport SL_CMosWrite(WORD Address, BYTE Value);
 40         BOOL    DllExport SL_ACPower();
            int     DllExport SL_GetBatteryLevel(int nBattery);
            DWORD   DllExport SL_GetBiosMemory(WORD wSegment, WORD
        wOffset, BYTE* pbBuffer, WORD wSize);
```

```
        DWORD  DllExport SL_MakeIntCall(WORD wInterrupt, union
REGS* pInRegs, union REGS* pOutRegs);
        DWORD  DllExport SL_ReadPort(WORD wPort, BYTE* pbValue);
        DWORD  DllExport SL_WritePort(WORD wPort, BYTE bValue);
5       Platforms DllExport SL_GetPlatform();
        Models   DllExport SL_GetModel();
endif ifdef __cplusplus
10      #ifndef _WIN32
            }
        #endif
#endif
: header file to interface between MBM and OS
```

What is claimed is:

1. A computing apparatus, comprising:
a processor connected to a system bus;
an input means connected to said processor by said system bus;
an output means connected to said processor by said system bus;
a module removably connected to said system bus;
a module controller that controls said module and is connected to said system bus;
a locking mechanism that locks and releases said module to and from said computing apparatus;
a basic input/output system (BIOS) connected to said system bus; and
a subsystem that controls said locking mechanism, said subsystem:
determining whether said module is being accessed by said processor;
communicating to said module controller to terminate input/output activity;
removing a plurality of device drivers for said module from said BIOS; and
informing an operating system that said module is removed.

2. The apparatus of claim 1, wherein said module is a battery system.

3. The apparatus of claim 1, wherein said module is a media bay module.

4. The apparatus of claim 3, wherein said media bay module is a CD-ROM.

5. The apparatus of claim 3, wherein said media bay module is a hard disk drive.

6. The apparatus of claim 3, wherein said media bay module is a floppy disk drive.

7. The apparatus of claim 3, wherein said media bay module is a magneto-optical drive.

8. A latch system for a computing device, said system comprising:
a processor connected to a system bus;
an input means connected to said processor by said system bus;
an output means connected to said processor by said system bus;
a module that inserts into said computing device and is connected to said system bus;
a module controller that controls said module and is connected to said system bus;
a latch that locks and releases said module to and from said computing device;
a basic input/output system (BIOS) connected to said system bus; and
a subsystem that controls said latch, wherein said subsystem includes:
a means to determine whether said module is being accessed by said processor;
a means to communicate to said module controller to terminate input/output activity;
a means to remove a plurality of device drivers for said module from said BIOS; and
a means to inform an operating system that said module is removed.

9. A computing apparatus, comprising:
a processor connected to a system bus;
a display coupled to said processor by said system bus;
a keyboard coupled to said processor by said system bus;
a module removably connected to said system bus;
a module controller that controls said module and is connected to said system bus;
a locking mechanism that locks said module to and unlocks said module from said computing apparatus;
a basic input/output system (BIOS) coupled to said system bus; and
a subsystem that controls said locking mechanism, wherein said subsystem includes:
determines whether said module is being accessed by said processor;
communicates to said module controller to terminate input/output activity;
removes a plurality of device drivers for said module from said BIOS; and
removes informs an operating system that said module is removed.

10. The apparatus of claim 9, wherein said locking mechanism selectively locks said module to said computing apparatus and unlocks said module from said computing apparatus when said locking mechanism is enabled.

11. The apparatus of claim 10, wherein said locking mechanism remains locked after said apparatus is powered down with the locking mechanism in its locked position.

12. The apparatus of claim 9, wherein said module remains unlocked from said computing apparatus when said locking mechanism is disabled.

13. The apparatus of claim 10, wherein said module remains unlocked from said computing apparatus when said locking mechanism is disabled.

14. The apparatus of claim 9, wherein the software controlling the locking mechanism is password protected.

15. The apparatus of claim 9, wherein said locking mechanism comprises a latching mechanism that latches said module to the computing apparatus and a solenoid that blocks the movement of the latching mechanism when said locking mechanism is in its locked position.

* * * * *